(12) United States Patent
Dong

(10) Patent No.: US 12,321,181 B2
(45) Date of Patent: Jun. 3, 2025

(54) SYSTEM AND METHOD FOR INTELLIGENTLY INTERPRETING EXHIBITION SCENE

(71) Applicant: BOE Technology Group Co., Ltd., Beijing (CN)

(72) Inventor: Zhaochao Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/018,903

(22) PCT Filed: Feb. 28, 2022

(86) PCT No.: PCT/CN2022/078385
§ 371 (c)(1),
(2) Date: Jan. 31, 2023

(87) PCT Pub. No.: WO2023/159591
PCT Pub. Date: Aug. 31, 2023

(65) Prior Publication Data
US 2024/0272648 A1    Aug. 15, 2024

(51) Int. Cl.
*G05D 1/686*    (2024.01)
*G05D 1/243*    (2024.01)
(Continued)

(52) U.S. Cl.
CPC ............. *G05D 1/686* (2024.01); *G05D 1/243* (2024.01); *G06T 7/62* (2017.01); *G06T 7/70* (2017.01);
(Continued)

(58) Field of Classification Search
CPC .... G05D 1/686; G05D 1/243; G05D 2105/70; G05D 2111/10; G05D 1/02; G05D 1/12;
(Continued)

(56) References Cited

U.S. PATENT DOCUMENTS

2006/0106496 A1* 5/2006 Okamoto ............. G05D 1/0278
700/255
2016/0188977 A1* 6/2016 Kearns ................... B25J 11/002
348/113
(Continued)

FOREIGN PATENT DOCUMENTS

CN    104951891 A    9/2015
CN    106970627 A    7/2017
(Continued)

OTHER PUBLICATIONS

JP 2004299025 A with English translation; date filed Apr. 1, 2003; date published Oct. 28, 2004. (Year: 2004).*
(Continued)

*Primary Examiner* — Calvin Cheung
(74) *Attorney, Agent, or Firm* — ArentFox Schiff LLP; Michael Fainberg

(57) ABSTRACT

Provided are a system and method for intelligently interpreting an exhibition scene. The system is configured for automatically following an interpretation user or a visitor by means of an intelligent following apparatus, so as to improve visiting experience of the visitor. The system includes a positioning apparatus and the intelligent following apparatus, the positioning apparatus is configured for determining positioning information of target users, and the intelligent following apparatus is configured for following the target users to move according to the positioning information of the target users.

17 Claims, 8 Drawing Sheets

(51) Int. Cl.
  *G06T 7/62* (2017.01)
  *G06T 7/70* (2017.01)
  *G06V 20/52* (2022.01)
  *G05D 105/70* (2024.01)
  *G05D 111/10* (2024.01)
  *G16Y 20/10* (2020.01)
  *G16Y 40/35* (2020.01)
  *G16Y 40/60* (2020.01)

(52) U.S. Cl.
  CPC ......... *G06V 20/53* (2022.01); *G05D 2105/70* (2024.01); *G05D 2111/10* (2024.01); *G06T 2207/30196* (2013.01); *G06T 2207/30244* (2013.01); *G16Y 20/10* (2020.01); *G16Y 40/35* (2020.01); *G16Y 40/60* (2020.01)

(58) Field of Classification Search
  CPC ... G06T 7/62; G06T 7/70; G06T 2207/30196; G06T 2207/30244; G06V 20/53; G16Y 20/10; G16Y 40/35; G16Y 40/60
  See application file for complete search history.

(56) References Cited

U.S. PATENT DOCUMENTS

| | | | |
|---|---|---|---|
| 2017/0368691 | A1* | 12/2017 | Li .................... B25J 13/089 |
| 2018/0181137 | A1 | 6/2018 | Choi et al. |

FOREIGN PATENT DOCUMENTS

| | | | |
|---|---|---|---|
| CN | 107553505 | A | 1/2018 |
| CN | 207424681 | U | 5/2018 |
| CN | 108200331 | A | 6/2018 |
| CN | 108549410 | A | 9/2018 |
| CN | 109129507 | A | 1/2019 |
| CN | 109389918 | A | 2/2019 |
| CN | 110405767 | A | 11/2019 |
| CN | 112418145 | A | 2/2021 |
| CN | 113696191 | A | 11/2021 |
| JP | 2006212732 | A | 8/2006 |
| WO | WO-2018127452 | A1 * | 7/2018 ............ G08B 21/22 |

OTHER PUBLICATIONS

JP 2008250639 A with English translation; date filed Mar. 30, 2007; date published Oct. 16, 2008. (Year: 2008).*
KR 20140077655 A with English translation; date filed Dec. 14, 2012; date published Jun. 24, 2014. (Year: 2014).*
CN 105467359 A with English translation; date filed Feb. 12, 2015; date published Apr. 6, 2016. (Year: 2016).*
English Translation of the Written Opinion of the International Searching Authority for PCT/CN2022/078385, date of mailing Nov. 17, 2022. (Year: 2022).*
CN 110405767 A with English translation; date filed Aug. 1, 2019; date published Nov. 5, 2019. (Year: 2019).*
CN 106970627 A with English translation; date filed May 17, 2017; date published Jul. 21, 2017. (Year: 2017).*
CN 108536145 A with English translation; date filed Apr. 10, 2018; date published Sep. 14, 2018. (Year: 2018).*
CN 106774325 A with English translation; date filed Dec. 23, 2016; date published May 31, 2017. (Year: 2017).*
CN 106843280 A with English translation; date filed Feb. 17, 2017; date published Jun. 13, 2017. (Year: 2017).*
CN 108681340 A with English translation; date filed Apr. 23, 2018; date published Oct. 19, 2018. (Year: 2018).*
KR 100834577 B1 with English translation; date filed Dec. 7, 2006; date published Dec. 7, 2006. (Year: 2006).*
DE 102017117013 A1 with English translation; date filed Jul. 27, 2017; date published Jan. 31, 2019. (Year: 2019).*
Zhang et al., Intelligent Follow and Explain Robot Based on UWB Technology, Quality Assurance, vol. 13, 2018.
Kai Xu, Algorithm Research and Software Development of Slam-based Follow-up Teaching Explaining Robot, China Master's Thesis Full-text Database (Information Technology Series), vol. 11, 2021.
Edmonds et al., A Tale of Two Explanations:Enhancing Human Trust by Explaining Robot Behavior, Science Robotics 4, Dec. 18, 2019.

* cited by examiner

SYSTEM AND METHOD FOR INTELLIGENTLY INTERPRETING EXHIBITION SCENE

CROSS REFERENCE TO RELATED APPLICATIONS

The present disclosure is a US National Stage of International Application No. PCT/CN2022/078385, filed on Feb. 28, 2022, the entire contents of which are incorporated herein by reference.

FIELD

The present disclosure relates to the technical field of Internet of Things, and particularly to a system and method for intelligently interpreting an exhibition scene.

BACKGROUND

An exhibition system, a display and demonstration system, is generally used in exhibition halls of government, enterprises, and museums to realize on-off control, play control and interaction control of exhibit devices. Most exhibits exhibited or displayed in the exhibition halls are all-in-one terminal devices generally composed of hosts and display screens.

At present, interpreters will manually interpret the exhibits in the exhibition halls after receiving visiting groups. However, such an interpretation method is single and boring with unsatisfactory interpretation effect, which affects the visiting experience of visitors.

SUMMARY

The present disclosure provides a system and method for intelligently interpreting an exhibition scene. The system is configured for automatically following an interpretation user or a visitor by means of an intelligent following apparatus, so as to improve visiting experience of the visitor.

In a first aspect, an embodiment of the present disclosure provides a system for intelligently interpreting an exhibition scene. The system includes an intelligent following apparatus and a positioning apparatus, the positioning apparatus is configured for determining positioning information of target users, and the intelligent following apparatus is configured for following the target users to move according to the positioning information of the target users.

As an optional embodiment, the intelligent following apparatus is further configured for generating a control instruction, and correspondingly controlling at least one exhibition assembly according to the generated control instruction.

As an optional embodiment, the intelligent following apparatus further includes a sounding device, and the intelligent following apparatus intelligently interprets exhibit information of at least one exhibit by means of the sounding device.

As an optional embodiment, the intelligent following apparatus is further configured for executing switching between a plurality of following modes, types of target users followed by the intelligent following apparatus in different following modes are different, and the types of the target users are determined according to at least one of a visiting purpose, an interaction relation with an exhibit, and an interaction relation with an exhibition assembly.

As an optional embodiment, the intelligent following apparatus is further configured for stopping following when the target users stop moving, and determining position information of the intelligent following apparatus when following is stopped.

As an optional embodiment, the control instruction is generated through the following method: generating the control instruction by the intelligent following apparatus according to the positioning information of the target users; or generating the control instruction by the intelligent following apparatus according to positioning information of the intelligent following apparatus.

As an optional embodiment, the intelligent following apparatus intelligently interpreting exhibit information of at least one exhibit by means of the sounding device includes: the intelligent following apparatus determining the at least one exhibit according to the positioning information of the target users, and intelligently interpreting the exhibit information of the at least one exhibit by means of the sounding device; or the intelligent following apparatus determining the at least one exhibit according to positioning information of the intelligent following apparatus, and intelligently interpreting the exhibit information of the at least one exhibit by means of the sounding device.

As an optional embodiment, in the case that the target users followed by the intelligent following apparatus includes a first user visiting the exhibit, the following mode includes at least one method for intelligently interpreting exhibit information by the intelligent following apparatus.

As an optional embodiment, the intelligent following apparatus determining position information when following is stopped includes: the intelligent following apparatus determining the shortest line segment according to positioning information when the target users stop moving and an exhibit closest to the positioning information; the intelligent following apparatus determining a preset area by taking the positioning information when moving is stopped as a center; and the intelligent following apparatus determining, according to an intersection of the shortest line segment and the preset area and an orientation of the intelligent following apparatus relative to the target users, the position information of the intelligent following apparatus when following is stopped.

As an optional embodiment, the intelligent following apparatus determining the shortest line segment according to positioning information when the target users stop moving and an exhibit closest to the positioning information includes: the intelligent following apparatus determining the shortest line segment according to the positioning information when the target users stop moving and an edge position of the exhibit closest to the positioning information.

As an optional embodiment, the target users include a first user visiting the exhibit.

As an optional embodiment, the intelligent following apparatus triggers generation of the control instruction in response to a first operation of the target users.

As an optional embodiment, the intelligent following apparatus executing switching between a plurality of following modes includes: the intelligent following apparatus triggering generation of a switching instruction in response to a second operation of the target users, and executing switching between the plurality of following modes according to the switching instruction.

As an optional embodiment, the intelligent following apparatus determining the shortest line segment according to positioning information when the target users stop moving and an exhibit closest to the positioning information includes: the intelligent following apparatus determining the shortest line segment according to the positioning information when the target users stop moving and a center position of the exhibit closest to the positioning information.

As an optional embodiment, the target users include a second user introducing the exhibit.

As an optional embodiment, in the case that the target users followed by the intelligent following apparatus include a second user introducing the exhibit, the following mode includes at least one method of controlling the exhibition assembly by the intelligent following apparatus.

As an optional embodiment, the intelligent following apparatus executing switching between a plurality of following modes includes: the intelligent following apparatus triggering execution of switching between the plurality of following modes according to positioning information of different types of target users.

As an optional embodiment, the target users include a first user visiting the exhibit and a second user introducing the exhibit, and the intelligent following apparatus triggering execution of switching between the plurality of following modes according to positioning information of different types of target users includes: the intelligent following apparatus triggering execution of switching between the plurality of following modes according to positioning information of the first user and the second user.

As an optional embodiment, the intelligent following apparatus triggering execution of switching between the plurality of following modes according to positioning information of the first user and the second user includes: the intelligent following apparatus triggering execution of switching between the plurality of following modes according to the positioning information of the first user and the second user and crowd density information of the first user.

As an optional embodiment, the intelligent following apparatus includes a touch display screen, and generation of the control instruction is triggered by a touch signal received by the touch display screen.

As an optional embodiment, the intelligent following apparatus includes a touch display screen, and generation of the switching instruction is triggered by a touch signal received by the touch display screen.

As an optional embodiment, the intelligent following apparatus includes a touch display screen, and the intelligent following apparatus is further configured for displaying an image of the exhibit information of the at least one exhibit by means of the touch display screen.

As an optional embodiment, the positioning apparatus includes positioners, and the positioning apparatus determines the positioning information of the target users through the following method: determining the positioning information of the target users by the positioning apparatus by means of the positioners carried by the target users.

As an optional embodiment, the target users include a second user introducing the exhibit.

As an optional embodiment, there are a plurality of target users, and the determining the positioning information of the target users by the positioning apparatus by means of the positioners carried by the target users includes: determining an area containing the plurality of target users by the positioning apparatus according to the positioners carried by the plurality of target users; and determining the positioning information of the target users by the positioning apparatus according to a center point of the area or the positioner of the target user closest to the center point of the area.

As an optional embodiment, the positioning apparatus includes a camera assembly, and the positioning apparatus determines the positioning information of the target users through the following method: determining the positioning information of the target users by the positioning apparatus according to an image of the target users acquired by the camera assembly.

As an optional embodiment, there are a plurality of target users, and the determining the positioning information of the target users by the positioning apparatus according to an image of the target users acquired by the camera assembly includes: identifying, by the positioning apparatus, an image containing a plurality of target users acquired by the camera assembly to determine an area containing the plurality of target users; and determining the positioning information of the target users by the positioning apparatus according to a center point of the area or a position of the target user closest to the center point of the area, the position of the target user closest to the center point of the area being obtained by identifying the image containing the plurality of target users.

As an optional embodiment, the target users include a first user visiting the exhibit.

As an optional embodiment, in the case that the target users include a first user visiting the exhibit, the positioning apparatus is further configured for determining crowd density information of the first user through the following method: determining the crowd density information of the first user by the positioning apparatus according to a size of the area and the quantity of positioners detected in the area.

As an optional embodiment, in the case that the target users include a first user visiting the exhibit, the positioning apparatus determines crowd density information of the first user through the following method: determining the crowd density information of the first user by the positioning apparatus according to a size of the area and the quantity of the first user identified in the area.

As an optional embodiment, the positioning apparatus includes positioners, and the positioning apparatus is further configured for determining the positioning information of the intelligent following apparatus through the following method: determining the positioning information of the intelligent following apparatus by the positioning apparatus according to the positioner carried by the intelligent following apparatus.

As an optional embodiment, the positioning apparatus includes a camera assembly, and the positioning apparatus is further configured for determining the positioning information of the intelligent following apparatus through the following method: identifying, by the positioning apparatus, an image containing the intelligent following apparatus acquired by the camera assembly to determine the positioning information of the intelligent following apparatus.

As an optional embodiment, the exhibit information includes at least one of a video, a picture, an audio, light and a projection.

As an optional embodiment, the control instruction includes at least one of play switching, pause, volume adjustment, play progress adjustment and on-off control.

As an optional embodiment, the exhibition assembly includes at least one of a display assembly, a light assembly, an intelligent air conditioner device and an intelligent internet of things device.

In a second aspect, an embodiment of the present disclosure provides a method for intelligently interpreting an exhibition scene. The method includes: determining positioning information of target users; and following the target users to move according to the positioning information of the target users.

As an optional embodiment, the method further includes: generating a control instruction, and correspondingly controlling at least one exhibition assembly according to the generated control instruction.

As an optional embodiment, the method further includes: intelligently interpreting exhibit information of at least one exhibit.

As an optional embodiment, the method further includes: executing switching between a plurality of following modes, where types of target users followed by the intelligent following apparatus in different following modes are different, and the types of the target users are determined according to at least one of a visiting purpose, an interaction relation with the exhibit, and an interaction relation with an exhibition assembly.

As an optional embodiment, the method further includes: stopping following when the target users stop moving, and determining position information of an intelligent following apparatus when following is stopped.

As an optional embodiment, the control instruction is generated through the following method: generating the control instruction according to the positioning information of the target users; or generating the control instruction according to positioning information of the intelligent following apparatus.

As an optional embodiment, the intelligently interpreting exhibit information of at least one exhibition includes: determining the at least one exhibit according to the positioning information of the target users, and intelligently interpreting the exhibit information of the at least one exhibit; or determining the at least one exhibit according to positioning information of the intelligent following apparatus, and intelligently interpreting the exhibit information of the at least one exhibit.

As an optional embodiment, in the case that the target users followed by the intelligent following apparatus include a first user visiting the exhibit, the following mode includes at least one method for intelligently interpreting exhibit information by the intelligent following apparatus.

As an optional embodiment, determining position information when following is stopped includes: determining the shortest line segment according to positioning information when the target users stop moving and an exhibit closest to the positioning information; determining a preset area by taking the positioning information when moving is stopped as a center; and determining, according to an intersection of the shortest line segment and the preset area and an orientation of the intelligent following apparatus relative to the target users, the position information of the intelligent following apparatus when following is stopped.

As an optional embodiment, the determining the shortest line segment according to positioning information when the target users stop moving and an exhibit closest to the positioning information includes: determining the shortest line segment according to the positioning information when the target users stop moving and an edge position of the exhibit closest to the positioning information.

As an optional embodiment, the target users include a first user visiting the exhibit.

As an optional embodiment, generation of the control instruction is triggered in response to a first operation of the target users.

As an optional embodiment, the executing switching between a plurality of following modes includes: triggering generation of a switching instruction in response to a second operation of the target users, and executing switching between the plurality of following modes according to the switching instruction.

As an optional embodiment, the determining the shortest line segment according to positioning information when the target users stop moving and an exhibit closest to the positioning information includes: determining the shortest line segment according to the positioning information when the target users stop moving and a center position of the exhibit closest to the positioning information.

As an optional embodiment, the target users include a second user introducing the exhibit.

As an optional embodiment, when the target users followed by the intelligent following apparatus include a second user introducing the exhibit, the following mode includes at least one mode of controlling the exhibition assembly by the intelligent following apparatus.

As an optional embodiment, the executing switching between a plurality of following modes includes: triggering execution of switching between the plurality of following modes according to positioning information of different types of target users.

As an optional embodiment, the target users include a first user visiting the exhibit and a second user introducing the exhibit, and the triggering execution of switching between the plurality of following modes by the intelligent following apparatus according to positioning information of different types of target users includes: triggering execution of switching between the plurality of following modes according to positioning information of the first user and the second user.

As an optional embodiment, the triggering execution of switching between the plurality of following modes by the intelligent following apparatus according to positioning information of the first user and the second user includes: triggering execution of switching between the plurality of following modes according to the positioning information of the first user and the second user and crowd density information of the first user.

As an optional embodiment, generation of the control instruction is triggered by a touch signal received by a touch display screen.

As an optional embodiment, generation of the switching instruction is triggered by a touch signal received by a touch display screen.

As an optional embodiment, the method further includes: displaying an image of the exhibit information of the at least one exhibit by means of the touch display screen.

As an optional embodiment, the positioning information of the target users is determined through the following method: determining the positioning information of the target users by means of positioners carried by the target users.

As an optional embodiment, the target users include a second user introducing the exhibit.

As an optional embodiment, there are a plurality of target users, and the determining the positioning information of the target users by means of the positioners carried by the target users includes: determining an area containing the plurality of target users according to the positioners carried by the plurality of target users; and determining the positioning information of the target users according to a center point of the area or the positioner of the target user closest to the center point of the area.

As an optional embodiment, the positioning information of the target users is determined through the following method: determining the positioning information of the target users according to an image of the target users acquired by a camera assembly.

As an optional embodiment, there are a plurality of target users, and the determining the positioning information of the target users according to an image of the target users acquired by the camera assembly includes: identifying an image containing a plurality of target users acquired by the camera assembly to determine an area containing the plurality of target users; and determining the positioning information of the target users according to a center point of the area or a position of the target user closest to the center point of the area, the position of the target user closest to the center point of the area being obtained by identifying the image containing the plurality of target users.

As an optional embodiment, the target users include a first user visiting the exhibit.

As an optional embodiment, in the case that the target users include a first user visiting the exhibit, crowd density information of the first user is determined through the following method: determining the crowd density information of the first user according to a size of the area and the quantity of positioners detected in the area.

As an optional embodiment, in the case that the target users include a first user visiting the exhibit, crowd density information of the first user is determined through the following method: determining the crowd density information of the first user according to a size of the area and the quantity of the first user identified in the area.

As an optional embodiment, the positioning information of an intelligent following apparatus is determined through the following method: determining the positioning information of the intelligent following apparatus according to a positioner carried by the intelligent following apparatus.

As an optional embodiment, the positioning information of an intelligent following apparatus is determined through the following method: identifying an image containing the intelligent following apparatus acquired by the camera assembly to determine the positioning information of the intelligent following apparatus.

As an optional embodiment, the exhibit information includes at least one of a video, a picture, an audio, light and a projection.

As an optional embodiment, the control instruction includes at least one of play switching, pause, volume adjustment, play progress adjustment and on-off control.

As an optional embodiment, the exhibition assembly includes at least one of a display assembly, a light assembly, an intelligent air conditioner device and an intelligent internet of things device.

In a third aspect, an embodiment of the present disclosure provides an apparatus for intelligently interpreting an exhibition scene. The apparatus includes: a positioning determination unit configured for determining positioning information of target users; and a movement following unit for following the target users to move according to the positioning information of the target users.

In a fourth aspect, an embodiment of the present disclosure provides a computer storage medium. The computer storage medium stores a computer program, and the program is configured for implementing steps of the method in the second aspect when executed by a processor.

These or other aspects of the present disclosure will be simpler, clearer and easier to understand in the description of the following embodiments.

BRIEF DESCRIPTION OF THE DRAWINGS

In order to describe technical solutions in embodiments of the present disclosure more clearly, accompanying drawings required for describing embodiments are briefly described below. Apparently, accompanying drawings in the following description show merely some embodiments of the present disclosure, and those of ordinary skill in the art would also be able to derive other accompanying drawings from these accompanying drawings without creative efforts.

DETAILED DESCRIPTION OF THE EMBODIMENTS

Figure 1:
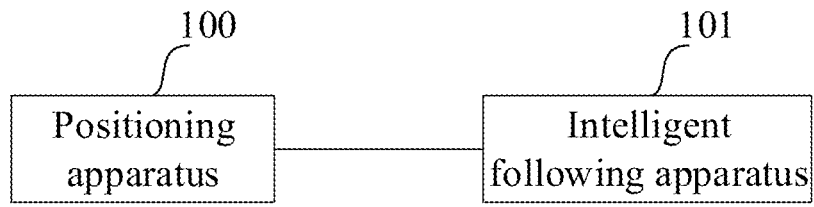
FIG. 1 shows a system for intelligently interpreting an exhibition scene according to an embodiment of the present disclosure.

In order to make the objectives, technical solutions and advantages of the present disclosure clearer, the present disclosure will be described in detail below in conjunction with accompanying drawings. Apparently, the described embodiments are some embodiments rather than all embodiments of the present disclosure. On the basis of embodiments of the present disclosure, all other embodiments obtained by those of ordinary skill in the art without making creative efforts fall within the scope of protection of the present disclosure.

Term "and/or" in embodiments of the present disclosure, which describes an association relation of associated objects, means that there can be three relations. For example, A and/or B can indicate independent existence of A, coexistence of A and B, and independent existence of B. Character "/" generally indicates that associated objects in the context are in an "or" relation.

Application scenes described in embodiments of the present disclosure are merely configured for more clearly describing technical solutions of embodiments of the present disclosure, and do not constitute a limitation on technical solutions provided in embodiments of the present disclosure. Those of ordinary skill in the art would know that with the evolution of new application scenes, technical solutions provided in embodiments of the present disclosure are also applicable to similar technical problems. In addition, in the description of the present disclosure, "a plurality of" means two or more, unless otherwise specified.

An exhibition system, a display and demonstration system, is generally used in exhibition halls of government, enterprises, and museums to realize on-off control, play control and interaction control of exhibit devices. Most exhibits exhibited or displayed in the exhibition halls are all-in-one terminal devices generally composed of hosts and display screens. At present, interpreters will manually interpret the exhibits in the exhibition halls after receiving visiting groups. However, such an interpretation method is single and boring with unsatisfactory interpretation effect, which affects the visiting experience of visitors.

A system for intelligently interpreting an exhibition scene provided in embodiments of the present disclosure includes an intelligent following apparatus and a positioning apparatus. The intelligent following apparatus in the embodiments includes, but is not limited to, an intelligent robot configured with a driving apparatus, so as to realize movement following by means of the driving apparatus.

The system for intelligently interpreting an exhibition scene provided in the embodiments may provide a more intelligent interpretation scene, and automatically follows interpreters or visitors by means of the intelligent following apparatus, so as to improve interpretation efficiency and visiting experience. The core idea of the design is to determine positioning information of target users by a positioning apparatus, and realize automatic following on the basis of the positioning information.

As shown in FIG. 1, the embodiments provide a system for intelligently interpreting an exhibition scene. The system includes a positioning apparatus 100 and an intelligent following apparatus 101.

The positioning apparatus 100 is configured for determining positioning information of target users.

The intelligent following apparatus 101 is configured for following the target users to move according to the positioning information of the target users.

It should be noted that the intelligent following apparatus 101 in the embodiments includes a controller for controlling the intelligent following apparatus to follow the target users to move, and may be further configured for carrying out other functions, such as, positioning information computation. Optionally, the controller may be separated from the intelligent following apparatus 101, and data and messages are transmitted between the controller and the intelligent following apparatus 101 in a wireless or wired manner. For example, the controller includes a server, and data computation involved in the intelligent following apparatus 101 is carried out by means of the server. The intelligent following apparatus 101 is controlled to implement automatic following by sending signaling to the intelligent following apparatus 101. Optionally, the controller is integrated with the intelligent following apparatus 101 and is built in the intelligent following apparatus 101. A structural relation and an information transmission mode between the controller and the intelligent following apparatus 101 are not excessively limited in the embodiments.

In some embodiments, the positioning apparatus 100 may be built in the intelligent following apparatus 101, that is, the positioning apparatus 100 serves as a component in the intelligent following apparatus 101.

In some embodiments, target users include, but are not limited to: a first user visiting an exhibit and a second user introducing an exhibit. Optionally, there are a plurality of first users and one second user. The first users may be visitors, and the second user may be an interpreter.

In some embodiments, in addition to automatic following, the intelligent following apparatus 101 may be further configured for implementing functions such as functions of controlling an exhibition assembly, intelligently interpreting exhibit information, and switching between following modes. These functions may be combined with each other or independently used, which is not excessively limited in the embodiments, and the above functions will be described one by one below.

In some embodiments, the intelligent following apparatus 101 is further configured for executing any one or more of the following functions.

1. Function of controlling exhibition assembly.

In some embodiments, the intelligent following apparatus 101 generates a control instruction, and correspondingly controls at least one exhibition assembly according to the generated control instruction.

Optionally, the control instruction in the embodiments includes, but is not limited to, at least one of play switching, pause, volume adjustment, play progress adjustment and on-off control.

Optionally, the exhibition assembly in the embodiments includes at least one of a display assembly, a light assembly, an intelligent air conditioner device and an intelligent internet of things device. The exhibition assembly is located in an exhibition hall, and during interpretation, an interpretation scene is enriched by controlling the exhibition assembly such that users may personally experience scenes related to the exhibit when visiting the exhibit and hearing exhibit information, thereby providing more appropriate and vivid interpretation experience for visiting users.

In the embodiments, the exhibition assembly may be controlled by means of the control instruction. The control instruction and the exhibition assembly may be in a corresponding relation, for example, brightness of a corresponding light assembly is controlled by means of a control instruction generated for the light assembly.

In some embodiments, a method for generating a control instruction in the embodiment includes, but is not limited to, any one of the following modes.

Mode 1a: automatically generate control instruction. This mode may automatically trigger generation of the control instruction on the basis of the positioning information, which is divided into the following two specific situations.

(1) generate the control instruction by the intelligent following apparatus 101 according to the positioning information of the target users; and (2) generate the control instruction by the intelligent following apparatus 101 according to positioning information of the intelligent following apparatus.

During implementations, after determining the positioning information of the target users, the intelligent following apparatus 101 generates the control instruction according to a distance between the positioning information and a preset position in an exhibition hall; or the intelligent following apparatus generates the control instruction according to a distance between a position of the intelligent following apparatus 101 and a preset position in an exhibition hall.

During implementations, in the case that the distance is less than or equal to a distance threshold, the control instruction is generated. For example, when detecting that the target users move to specified positions, or the intelligent following apparatus 101 moves to a specified position, the intelligent following apparatus 101 generates the control instruction to control a plurality of exhibition assemblies to realize linkage. For example, on-off control of internet of things devices for display, sound, light, electricity and projection, a combination of a plurality of playlists, switching between playing contents, play/pause, volume increase and decrease, fast forward/backward, etc. may be controlled.

Optionally, in the above two situations for automatically generating the control instruction, the target users may be first users visiting an exhibit. In a process that the intelligent following apparatus 101 follows the first users to move, when detecting that the first users reach at specified positions, the intelligent following apparatus 101 controls the exhibition assembly to execute a corresponding operation; or when detecting that the intelligent following apparatus 101 reaches a specified position, the intelligent following apparatus controls the exhibition assembly to execute a corresponding operation. Automatic control may be implemented in any method, and the exhibition assembly may be automatically controlled without operation of interpreters, which effectively improves visiting experience.

Optionally, in the above two situations for automatically generating the control instruction, the target users may be second users introducing an exhibit, and a specific method for generating the control instruction is the same as the method in the case that the target users are first users in principle, and will not be repeated herein.

Mode 1b: Manually trigger generation of the control instruction. Through this mode, generation of the control instruction may be triggered only when a first operation of the target users is received.

Optionally, the intelligent following apparatus triggers generation of the control instruction in response to the first operation of the target user. During implementations, the first operation may be an operation of clicking keys or buttons on the intelligent following apparatus, or an operation of touching a touch display screen.

In some embodiments, the intelligent following apparatus includes a touch display screen, and generation of the control instruction is triggered by a touch signal received by the touch display screen. That is, the target users carry out a first operation by means of the touch display screen to generate a touch signal, and generation of the control instruction is triggered on the basis of the touch signal. That is, the touch signal received by the touch display screen is generated by carrying out the first operation by the target users.

In some embodiments, in a mode of manually triggering generation of the control instruction, the target users may be second users introducing an exhibit. In a process that the intelligent following apparatus 101 follows the second users to move, the second users control the exhibition assembly to execute a corresponding operation in a manual triggering manner, which provides an assisted interpretation mode for interpreters. Therefore, interpretation efficiency is improved, an interpretation effect is enhanced, and visiting experience of visitors is improved.

Optionally, in the mode of manually triggering generation of the control instruction, the target users may be first users visiting an exhibit, and a method for generating the control instruction is the same as the principle of generating the control instruction in the case that the target users are second users, and will not be repeated herein.

In some embodiments, the control instruction is determined on the basis of the target users, and is specifically as follows.

Mode 1) in the case that the target users are first users, the control instruction includes an instruction for controlling the intelligent following apparatus to display exhibit information related to an exhibit when the intelligent following apparatus enters an exhibit area containing the exhibit.

During implementation, in the case that the target users are first users, the intelligent following apparatus is controlled to follow the first users to move; and when a server detects that positioning information of the intelligent following apparatus reaches an exhibit area containing an exhibit, a control instruction is sent to the intelligent following apparatus to instruct the intelligent following apparatus to automatically display an instruction of exhibit information related to the exhibit. In this way, for the first users, the exhibit information may be still displayed by means of the intelligent following apparatus without interpretation of second users, thereby improving viewing experience of the users.

Mode 2) In the case that the target users are second users, the control instruction includes an instruction for controlling, in response to an operation instruction triggered by the second users on the intelligent following apparatus, the intelligent following apparatus to display exhibit information corresponding to the operation instruction.

Mode 3) In the case that the target users are second users, the control instruction includes an instruction for controlling, in response to an operation instruction triggered by the second users on the intelligent following apparatus, the exhibit to execute an operation corresponding to the operation instruction.

During implementations, in the case that the target users are second users, the intelligent following apparatus, as an assisted interpretation device of the second users, may first display the exhibit information through interaction with the second users. After the second users trigger an operation instruction on the intelligent following apparatus, the intelligent following apparatus sends the operation instruction to the server, and the server, in response to the operation instruction triggered by the second users on the intelligent following apparatus, sends a control instruction to the intelligent following apparatus for instructing the intelligent following apparatus to display exhibit information corresponding to the operation instruction, and/or sends a control instruction to the exhibit for instructing the exhibit to execute an operation corresponding to the operation instruction.

In some embodiments, in the case that the target users are first users, before the following instruction and the control instruction are sent to the intelligent following apparatus, prompt information may be further sent to the intelligent following apparatus, so as to prompt the second users whether to switch to an automatic interpretation mode. The automatic interpretation mode represents that the intelligent following apparatus automatically displays exhibit information, and prompt information may be sent to the second users by means of voice, pop-up windows, etc. After the second users receive the prompt information, the second users determine whether to switch to an independent interpretation mode of the intelligent following apparatus. In the independent interpretation mode, the intelligent following apparatus follows the first users to move, and automatically displays the exhibit information related to the exhibit to the first users.

In some embodiments, after the prompt information is sent to the intelligent following apparatus, a switching instruction triggered by the second users on the intelligent following apparatus on the basis of the prompt information may be further received; the server sends, in response to the switching instruction triggered by the second user on the intelligent following apparatus on the basis of the prompt information, the following instruction and the control instruction to the intelligent following apparatus, so as to instruct the intelligent following apparatus to follow the first users to move; and the exhibit information is automatically displayed.

2. Function of intelligently interpreting exhibit information.

In some embodiments, the exhibit information includes at least one of a video, a picture, an audio, light, a projection, text and voice.

In some embodiments, the exhibit information of the exhibit may be understood as historical information related to a product or cultural relic, including production time or unearthed time, and meaning of the product or cultural relic. The exhibit information is interpreted by means of a video, a picture, an audio, light, a projection, text, voice, etc., such that understanding of visiting users is facilitated, understanding of visitors to the exhibit may be more vividly deepened, thereby improving visiting efficiency and visiting experience of visitors.

The intelligent following apparatus 101 further includes a sounding device, and the intelligent following apparatus intelligently interprets at least one piece of exhibit information by means of the sounding device.

In this case, the intelligent following apparatus 101 may automatically interpret exhibit information to assist the interpreters in providing more intelligent interpretation methods and scenes.

In some embodiments, the intelligent following apparatus 101 may determine the exhibit information and implement intelligent interpretation in any one of the following methods, which are specifically as follows.

Method 2a: determine at least one piece of exhibit information by the intelligent following apparatus 101 according to the positioning information of the target users, and intelligently interpret the at least one piece of exhibit information by means of the sounding device.

Optionally, there may be one or more pieces of exhibit information of one exhibit, which is not excessively limited in the embodiments.

Optionally, through this method, the target users include a first user visiting an exhibit. In a process that the intelligent following apparatus 101 follows the first user to move, when the intelligent following apparatus 101 reaches within an electronic fence detection range of a certain exhibit, at least one piece of exhibit information is intelligently interpreted by means of the sounding device. Therefore, manual interpretation by an interpreter is not required, and visiting experience of a user is improved by carrying out intelligent interpretation for a visitor.

During implementations, at least one piece of exhibit information is determined according to the positioning information of the first user, and the exhibit information is intelligently interpreted. Specifically, at least one exhibit information closest to the positioning information of the first user may be intelligently interpreted. Exhibit information of an exhibit having a distance from the first user within a preset range may be intelligently interpreted.

Optionally, through this method, the target users may include a second user introducing an exhibit, which is not excessively limited in the embodiments.

Method 2b: determine at least one piece of exhibit information by the intelligent following apparatus 101 according to positioning information of the intelligent following apparatus, and intelligently interpret the at least one piece of exhibit information by means of the sounding device.

Optionally, through this method, at least one piece of exhibit information closest to the positioning information of the intelligent following apparatus 101 may be intelligently interpreted.

In some embodiments, the intelligent following apparatus includes a touch display screen, and the intelligent following apparatus is further configured for displaying an image of the exhibit information of the at least one exhibit by means of the touch display screen.

3. Function of executing switching between a plurality of following modes by intelligent following apparatus 101.

Types of the target users followed by the intelligent following apparatus 101 in different following modes are different, and the types of the target users are determined according to at least one of a visiting purpose, an interaction relation with an exhibit, and an interaction relation with an exhibition assembly.

In some embodiments, the target users may be divided into two types, one type is first users visiting an exhibit, and the other type is second users introducing the exhibit. Optionally, a method for classifying the target users may be determined according to actual requirements. The classification method may be determined through the followings, which include, but are not limited to, at least one of a visiting purpose, an interaction relation with the exhibit, and an interaction relation with the exhibition assembly. The classification method in the embodiment is only an instance, and all embodiments on the basis of the same classification principle fall within the protection scope of the present disclosure.

In some embodiments, the embodiment provides at least two following modes, which are specifically as follows.

Mode 1) the intelligent following apparatus 101 follows first users.

In this mode, the intelligent following apparatus executes at least one intelligent interpretation method on exhibit information.

In some embodiments, in the case that the target users followed by the intelligent following apparatus include a first user visiting the exhibit, the following mode includes at least one method for intelligently interpreting exhibit information by the intelligent following apparatus.

Mode 2) The intelligent following apparatus 101 follows second users.

In this mode, the intelligent following apparatus executes at least one control mode on the exhibition assembly.

In some embodiments, in the case that the target users followed by the intelligent following apparatus include a second user introducing the exhibit, the following mode includes at least one mode of controlling the exhibition assembly by the intelligent following apparatus.

In some embodiments, the target users may be further classified in a finer granularity, and two or more following modes are provided, which may be specifically defined according to actual requirements. The following modes of different types of target users may be partially or completely different, which is not excessively limited in the embodiments.

During implementations, in order to determine which following mode is used, it is necessary to determine whether the target users followed by the intelligent following apparatus are users visiting the exhibit or users introducing the exhibit, such that according to the determined target users, the exhibition assembly or the exhibit information may be controlled to execute corresponding operations when the target users are more accurately followed. Therefore, interpreters are assisted in interpretation. In the case that it is determined that target users are first users visiting the exhibit, the first users visiting the exhibit are followed, and the exhibit information related to the exhibit is automatically interpreted, such that visiting experience and effect of users are improved.

In some embodiments, target users followed by the intelligent following apparatus may be determined from the first users and the second users according to distances between the first users and the second users, a following instruction is generated according to positioning information of the target users and the intelligent following apparatus, a control instruction is determined according to the target users, and according to the following instruction and the control instruction, movement following is carried out on the target users, and the exhibit information related to the exhibit is displayed.

In the embodiments, distances between visitors and interpretation users may be obtained according to the distances between the first users and the second users. Therefore, in the case that the visitors are far away from the interpretation users, the visitors are taken as the target users, the intelligent following apparatus is controlled to follow the visitors to move, and display information related to the exhibit is automatically displayed for visitors. In the case that the interpretation users are taken as the target users, the intelligent following apparatus is controlled to follow the interpretation users to move, and through interaction between the interpretation users and the intelligent following apparatus, interpretation is assisted, and viewing experience of the users is improved.

In the embodiments, after it is determined that the target users are visitors or interpretation users, the control instruction is generated according to the positioning information of the target user and the intelligent following apparatus, the intelligent following apparatus is controlled to follow the target users to move, and the control instruction is determined according to the target users, such that the intelligent following apparatus is controlled to display the exhibit information. According to the method for intelligently interpreting an exhibition scene disclosed in the embodiments, automatic following may be carried out for different target users, and exhibit information may be displayed for different target users, such that visiting experience of the users is effectively improved. According to the method provided in the embodiments, the intelligent following apparatus may assist the interpretation users in better content display and exhibit control, such that hands of the interpretation users are liberated, and an interpretation effect is improved. When there is a large quantity of visitors, the intelligent following apparatus may realize independent interpretation, such that it is ensured that all people may receive interpretation information, workload of interpretation users is reduced, and visiting experience of visitors is improved.

In some embodiments, switching between following modes of the intelligent following apparatus is manually triggered.

Optionally, the intelligent following apparatus triggers generation of a switching instruction in response to a second operation of the target users, and executes switching between the plurality of following modes according to the switching instruction. A manual switching method includes a method of switching manual triggering of physical keys and a method of switching manual triggering of virtual keys, which is not excessively limited in the embodiments. Optionally, the physical keys are located on the intelligent following apparatus, and the virtual keys are located on a display screen of the intelligent following apparatus.

Optionally, the target users may be second users, and during implementations, the second users (interpreters) manually switch the following modes.

Optionally, the target users may be first users, and the first users may also manually switch the following modes, which is not excessively limited in the embodiments.

In some embodiments, the intelligent following apparatus includes a touch display screen, and generation of the switching instruction is triggered by a touch signal received by the touch display screen. The target users carry out a second operation by means of the touch display screen to generate a touch signal (that is, a switching instruction).

In some embodiments, the intelligent following apparatus may automatically switch between the following modes.

Optionally, the intelligent following apparatus triggers execution of switching between the plurality of following modes according to positioning information of different types of target users.

In some embodiments, the target users include first users visiting the exhibit and second users introducing the exhibit, and the intelligent following apparatus triggers execution of switching between the plurality of following modes by the intelligent following apparatus according to positioning information of the first users and the second users.

In some embodiments, the distances between the first users and the second users are determined according to the positioning information of the first users and the second users, and execution of switching between the following modes is triggered according to the distances. During implementation, in the case that a current following mode is that the intelligent following apparatus follows the second users, if the distance is greater than or equal to a distance threshold, switching between the following modes is triggered, and the intelligent following apparatus is switched to follow the first users. Then, in a process that the intelligent following apparatus follows the first users, if it is detected that the distance is less than the distance threshold, switching between the following modes is continuously triggered, and the intelligent following apparatus is switched to follow the second users.

In the embodiment, the positioning information of the first users and the second users may be periodically detected, and the distances between the first users and the second users may be computed, such that whether the following modes are required to be switched may be periodically detected.

In some embodiments, in order to more accurately determine whether to switch the following modes, the intelligent following apparatus may further trigger execution of switching between the plurality of following modes according to the positioning information of the first users and the second users, and crowd density information of the first users.

In some embodiments, the distances between the first users and the second users are determined according to the positioning information of the first users and the second users, and execution of switching between the plurality of following modes is triggered according to the distances and the crowd density information.

During implementation, in the case that a current following mode is that the intelligent following apparatus follows the second users, if the distance is greater than or equal to a distance threshold and the crowd density information is greater than or equal to crowd density information threshold, switching between the following modes is triggered, and the intelligent following apparatus is switched to follow the first users. Then, if in a process that the intelligent following apparatus follows the first users, it is detected that the distance is less than the distance threshold and crowd density information is less than the crowd density information threshold, switching between the following modes is continuously triggered, and the intelligent following apparatus is switched to follow the second users.

It should be noted that the above-mentioned three methods in the embodiments may be combined in pairs to form a new solution, or may be combined to form a new solution, or may be independently implemented, which is not excessively limited in the embodiments.

In some embodiments, the embodiments include, but are not limited to, two interpretation modes. One is an assisted interpretation mode, and in this mode, it is determined the followed target users are second users, that is, interpretation users, and the intelligent following apparatus may assist the interpretation users in exhibit control, and a touch display screen (for example, a PAD) on the intelligent following apparatus may be taken down for use, so as to facilitate more convenient operation for interpretation users. In this mode, the interpretation users may open a play control interface of the exhibit by means of the intelligent following apparatus and trigger a play button, so as to play exhibit information such as an introduction video, picture and voice corresponding to the exhibit. The interpretation users may trigger operation instructions such as switching between play contents, play/pause, volume increase and decrease, fast forward backward, etc., and may also trigger on-off control of internet of things devices for display, sound, light and electricity, a projection, etc. Moreover, a scene may be switched, and the scene is defined as a combination of an on-off state of a plurality of internet of things devices and a play list.

The other one is an independent interpretation mode. In this mode, it is determined that the followed target users are first users, that is, visitors, and the intelligent following apparatus automatically follows the visitors. When it is determined that the intelligent following apparatus enters an exhibit area (for example, an electronic fence range) of a certain exhibit, interpretation contents set in advance for the exhibit will be automatically played. In this mode, visitors or interpreters are not required to carry out operations on the intelligent following apparatus. When it is detected that the intelligent following apparatus enters the exhibit area, the intelligent following apparatus is instructed to automatically display the exhibit information, for example, automatically play an introduction video, picture, voice, etc. of the exhibit.

In some embodiments, the embodiments may determine the followed target users through any one of the following methods.

Method 1: determine target users according to distances.

In some embodiments, target users followed by the intelligent following apparatus are determined from the first users and the second users according to distances between the first users and the second users.

In some embodiments, if the distances between the first users and the second users are greater than or equal to a distance threshold, the first users are determined as the target users; and if the distances between the first users and the second users are lower than the distance threshold, the second users are determined as the target users.

In some embodiments, there are a plurality of first users and one second user in the embodiments, that is, there are a plurality of visitors and one interpretation user. In this case, the distances between the first users and the second user are determined through the following methods 1a) and 1b).

1a) Compute first distances between the first users and the second user, and take an average value of the first distances as the distance between the first users and the second user.

Optionally, the distances between the first users and the second user may be computed according to the positioning information, that is, the distances may be computed according to the positioning information of the first users and the second user. The positioning information of the second user may be acquired by a positioner worn by the second user, and the positioning information of the first users may be acquired by positioners worn by the first users, or may be acquired by means of terminal devices of the first users. A specific method for acquiring positioning information is not excessively limited in the embodiments.

In some embodiments, the distances between the first users and the second user are determined through:

receiving positioning information sent by the first users and positioning information sent by the second user; and determining distances between the first users and the second user according to the positioning information of the first users and the positioning information of the second user. Optionally, in the case that there are a plurality of first users, first distances between the positioning information of the first users and the positioning information of the second user are computed, and an average value of the first distances is taken as the distances between the first users and the second user.

1b) Determine a center point of a first area containing the largest quantity of first users from respective areas of an exhibition hall, and take a distance between the center point and the second user as the distance between the first users and the second user. The position of the second user may be determined according to the positioning information reported by the second user.

Optionally, the area containing the first users may be an area which is not limited in size and may contain all the first users, or may be limited in size and contain as many first users as possible in the limited area. In the embodiments, determination of the area containing the first users is not excessively limited, and a determination rule may be defined according to actual requirements.

Optionally, the first area in the embodiments may be a circular area or a polygonal closed area, which is not excessively limited in the embodiments.

During implementations, original images in every areas in an exhibition hall may be acquired by a camera apparatus in the exhibition hall, at least one of face identification, human body identification, biological identification and human flow information identification is carried out on the original images, a user image containing the first users is screened from the required original images according to an identification result, and the area containing the first users is determined from the user images.

Method 2: Determine followed target users according to distance and crowd density.

In some embodiments, the target users followed by the intelligent following apparatus are determined from the first users and the second users according to the distances between the first users and the second users and the crowd density information of the first users. A method for determining the distances between the first users and the second users may be obtained with reference to the contents in method I mentioned above, and will not be repeated herein.

In some embodiments, if the distances are greater than or equal to a distance threshold, and the crowd density information is greater than or equal to a density threshold, the first users are determined as the target users; and if the distances are lower than a distance threshold, or the crowd density information is lower than a density threshold, the second users are determined as the target users.

In some embodiments, crowd density information of the first users is determined through the following method: determining a first area containing the largest quantity of first users from various areas of an exhibition hall, where the first area has a fixed size; and determine crowd density information of the first users according to the quantity of the first users contained in the first area. For example, the first area is a circular area having a radius of 2 m.

In the embodiments, the crowd density information of the first users is determined according to the quantity of the first users contained in the first area having a fixed size. For example, in a visiting process of the visitors, most of the visitors are concentrated in the first area having a fixed size, and a small quantity of the visitors are outside the first area, or all the visitors are concentrated in the first area having a fixed size, then according to the quantity of the visitors in the first area, crowd density information in the first area may be estimated.

In some embodiments, the crowd density information of the first users is determined through any one of the following methods 2a) and 2b).

2a) obtain area images related to various areas in the exhibition hall, identify the area images, and determine a first area containing the largest quantity of first users according to an identification result.

Optionally, various areas in the exhibition hall may be scanned to obtain area images, the area images are identified to obtain an area image containing the first users, and the first area containing the largest quantity of first users in the exhibition hall is determined according to various area images containing the first users; or an interior of the exhibition hall may be scanned by camera apparatuses arranged in the exhibition hall, for example, original images of the interior of the exhibition hall may be shot by the camera apparatuses arranged in various angles, various orientations and various areas in the exhibition hall, and the original images may be taken as the area images; or the interior of the exhibition hall may be periodically scanned and shot by the camera apparatuses to obtain area images, there are a plurality of area images, and shooting angles and shooting areas of the area images being different, and how to obtain the area images is not excessively limited in the embodiment. After the area images are obtained, at least one of face identification, human body identification, human flow information identification and biological identification is carried out on the area images.

2b) Receive positioning information related to various areas in the exhibition hall, and determine the first area containing the largest quantity of first users according to the positioning information of the first users in the received positioning information.

Optionally, the positioning information in the exhibition hall is scanned to obtain the positioning information related to various areas, the positioning information of the first users is determined from the positioning information related to various areas, and the first area containing the largest quantity of the first users is determined according to the received positioning information of the first users in the exhibition hall.

In some embodiments, the distances between the first users and the second users may be determined through the following steps:
(1) receiving positioning information sent by second users; and
(2) determining a distance between a center point of a first area containing the largest quantity of first users and the positioning information as the distances between the first users and the second users.

During implementations, after the first area containing the largest quantity of first users is determined through area image identification, the crowd density information of the first users may be determined according to the quantity of the first users in the first area, and the distances between the first users and the second users may be determined according to the distance between the center point of the first area and the positioning information of the second users. Therefore, followed target users are determined from the first users and the second users according to the crowd density information and the distances, so as to determine a current following mode.

Figure 2:
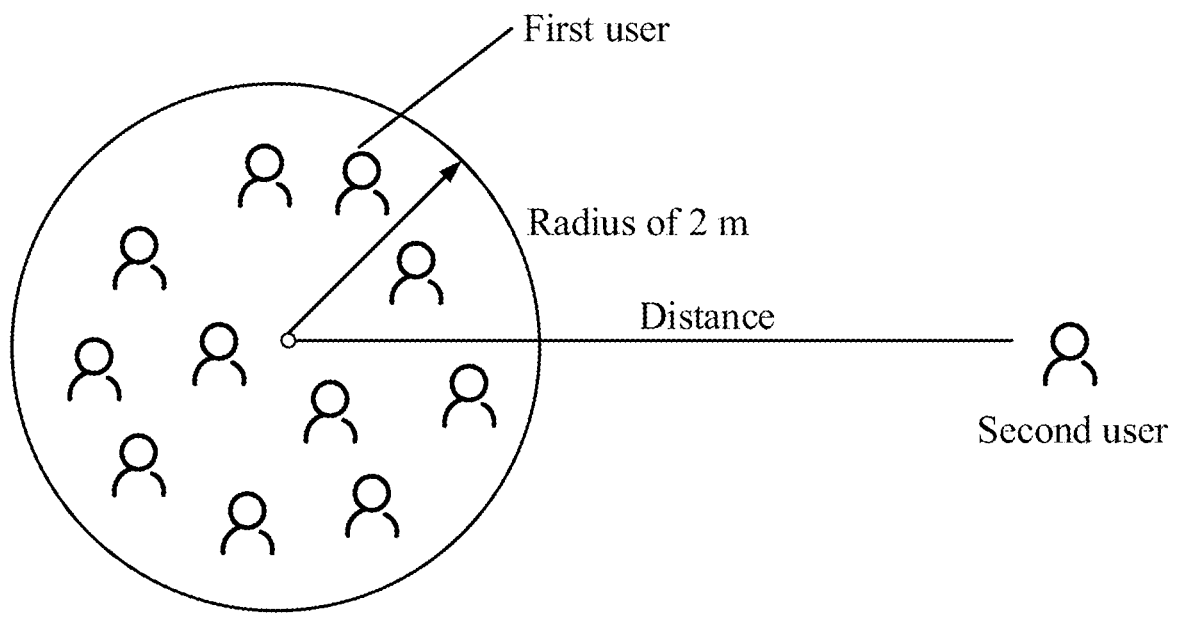
FIG. 2 is a schematic diagram of crowd density computation and distance computation according to an embodiment of the present disclosure.

As shown in FIG. 2, the embodiments provide a schematic diagram of crowd density computation and distance computation. For example, the first area is a circular area having a radius of 2 m, the density threshold is 10 people gathered in the circular area having a radius of 2 m, and the distance threshold is 8 m. Whether the quantity of the first users in the circular area having a radius of 2 m of the first area is greater than or equal to 10 is determined through computation, and whether distances from a center point of the circular area to second users are greater than or equal to 8 m is determined through computation, if both yes, the followed target users are determined as the first users, that is, the following mode is determined as a mode of following the first users, otherwise, the followed target users are determined as the second users, that is, the following mode is determined as a mode of following the second users.

In some embodiments, after it is determined that the followed target users are the first users or the second users, the determining corresponding positioning information according to different target users specifically includes: in the case that the target users are second users, receiving the positioning information of the second users, and determine the positioning information of the second users as the positioning information of the target users.

Since the second users are interpretation users, and there is usually one interpretation user, the positioning information of the target users may be determined according to the positioning information of the interpretation user, and the function of movement following is realized by the user intelligent following apparatus. It should be noted that, since in a movement process of the second users, the positioning information of the second user constantly changes, the positioning information of the target users also constantly changes along with the movement of the second users.

In the case that the target users are the first users, the positioning information is determined through any one of the following methods (1) and (2).

Method (1): determine a center point of a first area containing the largest quantity of first users as positioning information of the target users.

Through this method, if there is one first user in the first area containing the largest quantity of the first users, the positioning of the first user in the first area may be taken as the positioning information of the target user.

It should be noted that, with the movement of the first users, the center point of the first area containing the largest quantity of the first users also moves, such that the positioning information of the target users also moves with the movement of the first user.

Method (2): Receive the positioning information of the first user, and determine the positioning information of the target user according to the positioning information of the first user.

Through this method, if there are a plurality of first users, one piece of positioning information may be selected from positioning information of the plurality of first users to serve as positioning information of target users, and a selection rule may be that positioning information farthest from a second user is selected to serve as positioning information of the target users; or, in a first area containing the most pieces of positioning information in an exhibition hall, one piece of positioning information may be randomly selected to serve as the positioning information of the target users, the first area having a fixed size; or a mean of positioning information may be computed, and the mean is taken as positioning information of the target users, computation of the mean of the positioning information may be computation of a mean of all the positioning information, or computation of a mean of the positioning information with a maximum value and a minimum value removed, which is not excessively limited in the embodiments.

In some embodiments, after the target users and positioning information of the target users are determined, a corresponding following instruction is generated according to different target users, and a corresponding control instruction is determined, such that the intelligent following apparatus is instructed to follow the target users to move, and display information related to the exhibit is displayed, thereby improving visiting experience of the users.

In some embodiments, the following instruction is generated through the following method: generating a following instruction according to a shortest path between the target users and the positioning information of the intelligent following apparatus, and distances between the target users and the positioning information of the intelligent following apparatus, so as to instruct the intelligent following apparatus to move on the shortest path and ensure that the distances satisfy a preset range.

During implementations, after the positioning information of the target user and the intelligent following apparatus are determined, a shortest drivable path between the two pieces of positioning information may be determined. For example, an indoor building structure diagram of an exhibition hall is obtained in advance, and a shortest path between the target users and the intelligent following apparatus in an exhibition hall is determined according to positions of the target users in the exhibition hall and a position of the intelligent following apparatus in the exhibition hall. After the shortest path is determined, according to the distances between the target users and the positioning information, the intelligent following apparatus may be instructed to keep a distance between the intelligent following apparatus and the target users within a preset range. For example, the intelligent following apparatus is controlled to follow the target users to move, and the distances between the intelligent following apparatus and the target users are kept within the preset range, such that a following function is achieved without affecting movement of the target users.

In some embodiments, the embodiments further provide a method for updating the shortest path. During specific implementation, after the shortest path is determined, whether there is an obstacle on the shortest path may be determined in real time. If it is detected that there is an obstacle on the shortest path, the shortest path is updated according to position information of the obstacle on the shortest path, and the intelligent following apparatus is instructed to avoid the obstacle when moving according to the updated shortest path.

During implementation, if it is detected that there is an obstacle on the shortest path, the path at the obstacle is re-planned, driving paths of turning and a turned direction at the obstacle are computed, the shortest path is re-planned by taking the turned position as a starting point, and the intelligent following apparatus is instructed by means of the re-planned shortest path to avoid the obstacle in time when moving on the shortest path.

Figure 3:
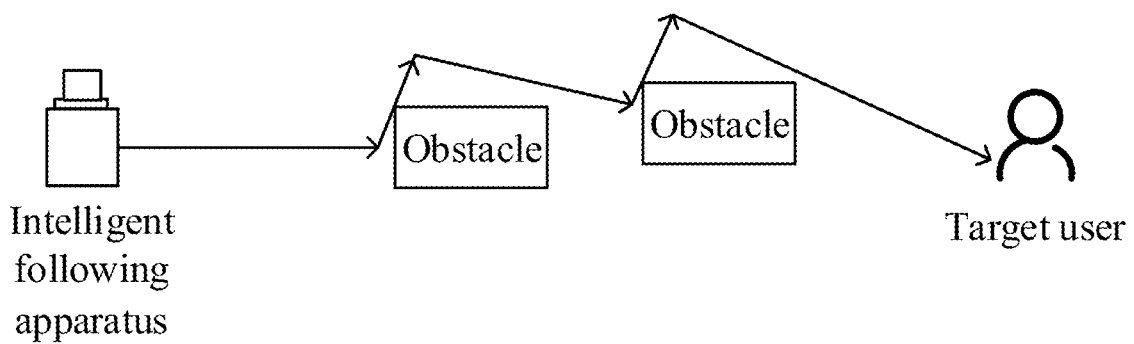
FIG. 3 is a schematic diagram of updating a shortest path according to an embodiment of the present disclosure.

As shown in FIG. 3, the embodiments provide a schematic diagram of updating the shortest path, the intelligent following apparatus follows the target user to move on the shortest path (a straight line segment between the position of the target users and the position of the intelligent following apparatus), turns to avoid an obstacle when encountering the obstacle, re-computes the shortest path after turning, and so on.

In some embodiments, the intelligent following apparatus is further configured for stopping following when the target users stop moving, and determining position information of the intelligent following apparatus when following is stopped.

In some embodiments, the intelligent following apparatus determines the position information when following is stopped through the following steps 1), 2) and 3).

1) Determine the shortest line segment by the intelligent following apparatus according to positioning information when the target users stop moving and an exhibit closest to the positioning information.

Specifically, in some embodiments, determine the shortest line segment by the intelligent following apparatus according to the positioning information when the target users stop moving and an edge position of the exhibit closest to the positioning information. Optionally, the target users include a first user visiting an exhibit or a second user introducing an exhibit.

Optionally, a line between the positioning information when the target users stop moving and an edge position of the exhibit closest to the positioning information may be taken as the shortest line segment; or a shortest path in an actual travelable path between the positioning information when the target users stop moving and an edge position of the exhibit closest to the positioning information may also be taken as the shortest line segment.

Optionally, the edge position of the exhibit includes, but is not limited to, an edge position closest to edges of the target users.

In some embodiments, the intelligent following apparatus determines the shortest line segment according to the positioning information when the target users stop moving and a center position of the exhibit closest to the positioning information. Optionally, the target users include a first user visiting an exhibit or a second user introducing an exhibit.

2) Determine a preset area by the intelligent following apparatus by taking the positioning information when moving is stopped as a center, where optionally, the preset area may be a circular area or a polygonal closed area, which is not excessively limited in the embodiments.

3) Determine, by the intelligent following apparatus according to an intersection of the shortest line segment and a preset area and an orientation of the intelligent following apparatus relative to the target users, the position information of the intelligent following apparatus when following is stopped.

Optionally, when following is stopped, the intelligent following apparatus faces the target users, and in the case that the intelligent following apparatus includes a touch display screen, the touch display screen faces the target users when the intelligent following apparatus stops following.

Figure 4:
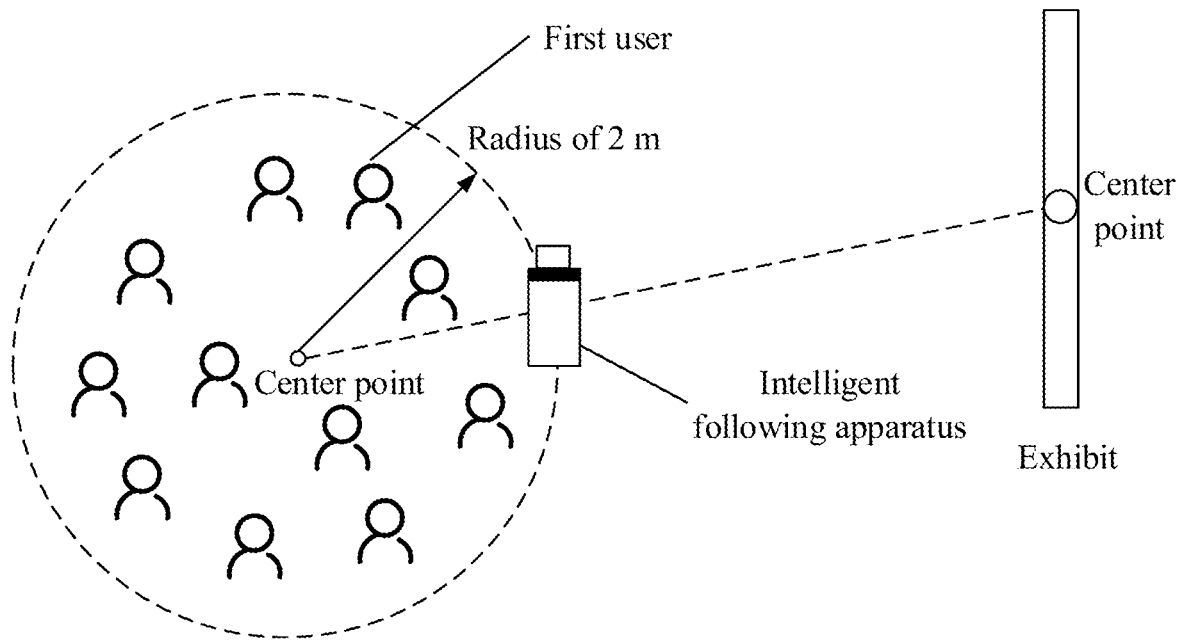
FIG. 4 is a schematic diagram of determining position information in the case that target users are first users according to an embodiment of the present disclosure.

As shown in FIG. 4, a schematic diagram of determining position information in the case that the target users are first users provided in the embodiments is shown, where a center point of a first area containing the largest quantity of first users is determined, the first area is a circular area having a radius of 2 m, and the position information is an intersection of a line connecting the center point and the center point of the exhibit and the boundary of the circular area.

Figure 5:
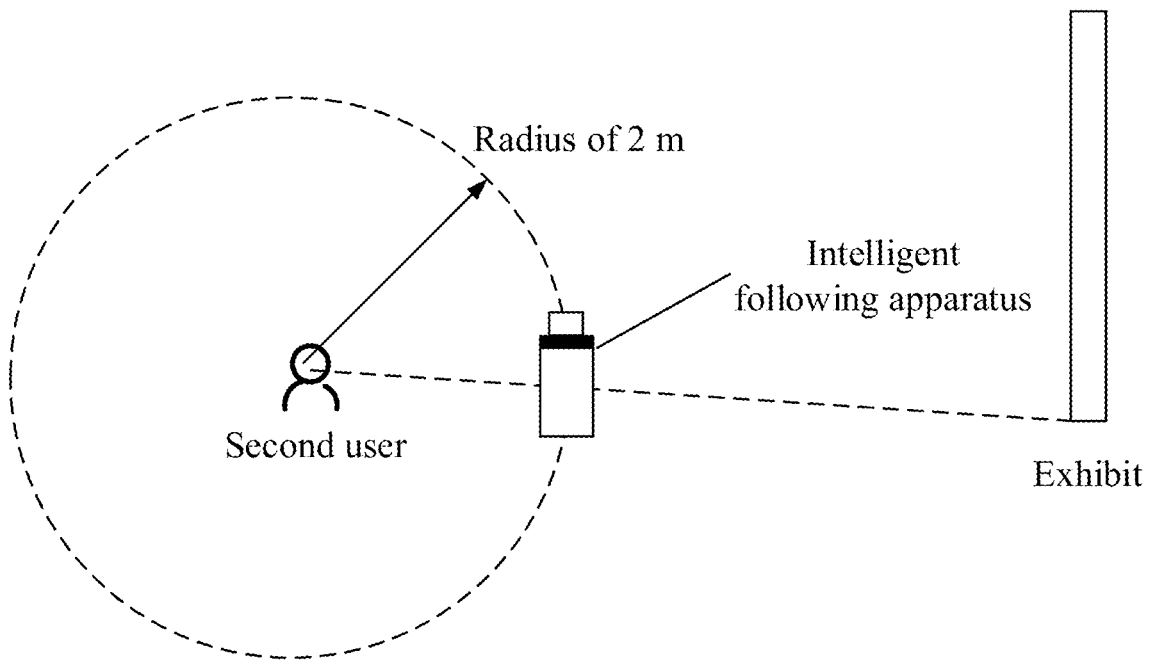
FIG. 5 is a schematic diagram of determining position information in the case that target users are second users according to an embodiment of the present disclosure.

As shown in FIG. 5, the embodiments provide a schematic diagram of determining position information in the case that the target users are second users provided in the embodiments is shown, where the positioning information of the second users is determined, a circular area is determined with the positioning information as the center and the radius of 2 m, and the position information is the intersection point of a line connecting the positioning information and the edge position of the exhibit and the boundary of the circular area. The edge position of the exhibit is the edge position of an edge of an exhibit closest to the interpretation users.

In some embodiments, the positioning technology used in the embodiment includes, but is not limited to, indoor positioning technology, such as indoor Bluetooth precise positioning technology and Bluetooth angle-of-arrival (AOA) technology, and the positioning accuracy may reach a range within 0.5 m. Positioning methods in the embodiments includes, but are not limited to, any one of the following methods 1, 2 and 3.

Positioning method 1: positioner positioning.

In some embodiments, the positioning apparatus in the embodiment includes positioners, and the positioning apparatus determines the positioning information of the target users through the following method: determining the positioning information of the target users by the positioning apparatus by means of the positioners carried by the target users.

Optionally, the positioners are indoor Bluetooth positioners.

Optionally, through this method, the target users may include second users introducing an exhibit. The positioning apparatus determines the positioning information of the second users by means of the positioners carried by the target users.

In some embodiments, there are a plurality of target users, and the determining the positioning information of the target users by the positioning apparatus by means of the positioners carried by the target users includes: determining an area containing a plurality of target users by the positioning apparatus according to the positioners carried by the plurality of target users; and determining the positioning information of the target users by the positioning apparatus according to a center point of the area or the positioner of the target user closest to the center point of the area.

Optionally, the target users include first users visiting an exhibit. The positioning apparatus determines an area containing a plurality of target users according to the positioners carried by the plurality of first users; and determines the positioning information of the target users according to a center point of the area or the positioner of the first user closest to the center point of the area.

In some embodiments, through this positioning method, crowd density information may be further determined through the following method: determining the crowd density information of the first user by the positioning apparatus according to a size of the area and the quantity of positioners detected in the area.

Positioning method 2: camera positioning.

In some embodiments, the positioning apparatus includes a camera assembly, and the positioning apparatus determines the positioning information of the target users through the following method: determining the positioning information of the target users by the positioning apparatus according to an image of the target users acquired by the camera assembly.

In some embodiments, there are a plurality of target users, and the positioning apparatus identifies an image containing a plurality of target users acquired by the camera assembly to determine an area containing the plurality of target users; and the positioning apparatus determines the positioning information of the target users according to a center point of the area or a position of the target user closest to the center point of the area.

The position of the target user closest to the center point of the area is obtained by identifying the image containing the plurality of target users.

Optionally, the target users include first users visiting an exhibit. The positioning apparatus identifies an image containing a plurality of first users acquired by the camera assembly to determine an area containing the plurality of first users; and the positioning apparatus determines the positioning information of the first users according to a center point of the area or a position of the first user closest to the center point of the area.

In some embodiments, through this positioning method, crowd density information may be further determined through the following method: determining the crowd density information of the first user by the positioning apparatus according to a size of the area and the quantity of the first user identified in the area.

Positioning method 3: combination of positioner positioning and camera positioning.

Through this method, positioning information of the second users may be determined by means of positioners, and positioning information of the first users may be determined through camera positioning; or the positioning information of the first users may be determined by means of positioners, and the positioning information of the second users may be determined through camera positioning, which is not excessively limited in the embodiments. Specific positioner positioning and camera positioning methods may be obtained with reference to the description of the abovementioned two positioning methods, and will not be repeated herein.

In some embodiments, the embodiment further provides any one of the following methods 1) and 2) for positioning the intelligent following apparatus.

Positioning method 1): positioner positioning.

The positioning apparatus includes positioners, and the positioning apparatus is further configured for determining the positioning information of the intelligent following apparatus through the following method: determining the positioning information of the intelligent following apparatus by the positioning apparatus according to the positioner carried by the intelligent following apparatus.

Positioning method 2): camera positioning.

The positioning apparatus includes a camera assembly, and the positioning apparatus is further configured for determining the positioning information of the intelligent following apparatus through the following method: identifying, by the positioning apparatus, an image containing the intelligent following apparatus acquired by the camera assembly to determine the positioning information of the intelligent following apparatus.

Figure 6:
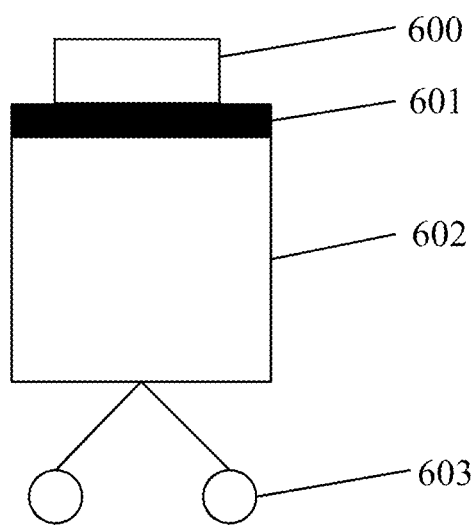
FIG. 6 is a schematic structural diagram of an intelligent following apparatus according to an embodiment of the present disclosure.

As shown in FIG. 6, an embodiment of the present disclosure further provides a schematic structural diagram of an intelligent following apparatus. The intelligent following apparatus includes a display 600, a display base 601, a main case 602 and a roller 603.

The display 600 may be taken down, and the display 600 includes a touch display screen, for example, an electronic display apparatus having a touch function, such as an electronic tablet.

The main case 602 includes other basic modules such as a controller and a driving apparatus.

In some embodiments, the intelligent following apparatus in the embodiment includes a controller (such as a server) and a follower, where the server is configured for implementing functions such as positioning, data processing and signal transceiving, and the follower is configured for implementing following. Interaction between the server and the follower will be described below by taking the intelligent following apparatus including the server and the follower as an example.

Figure 7:
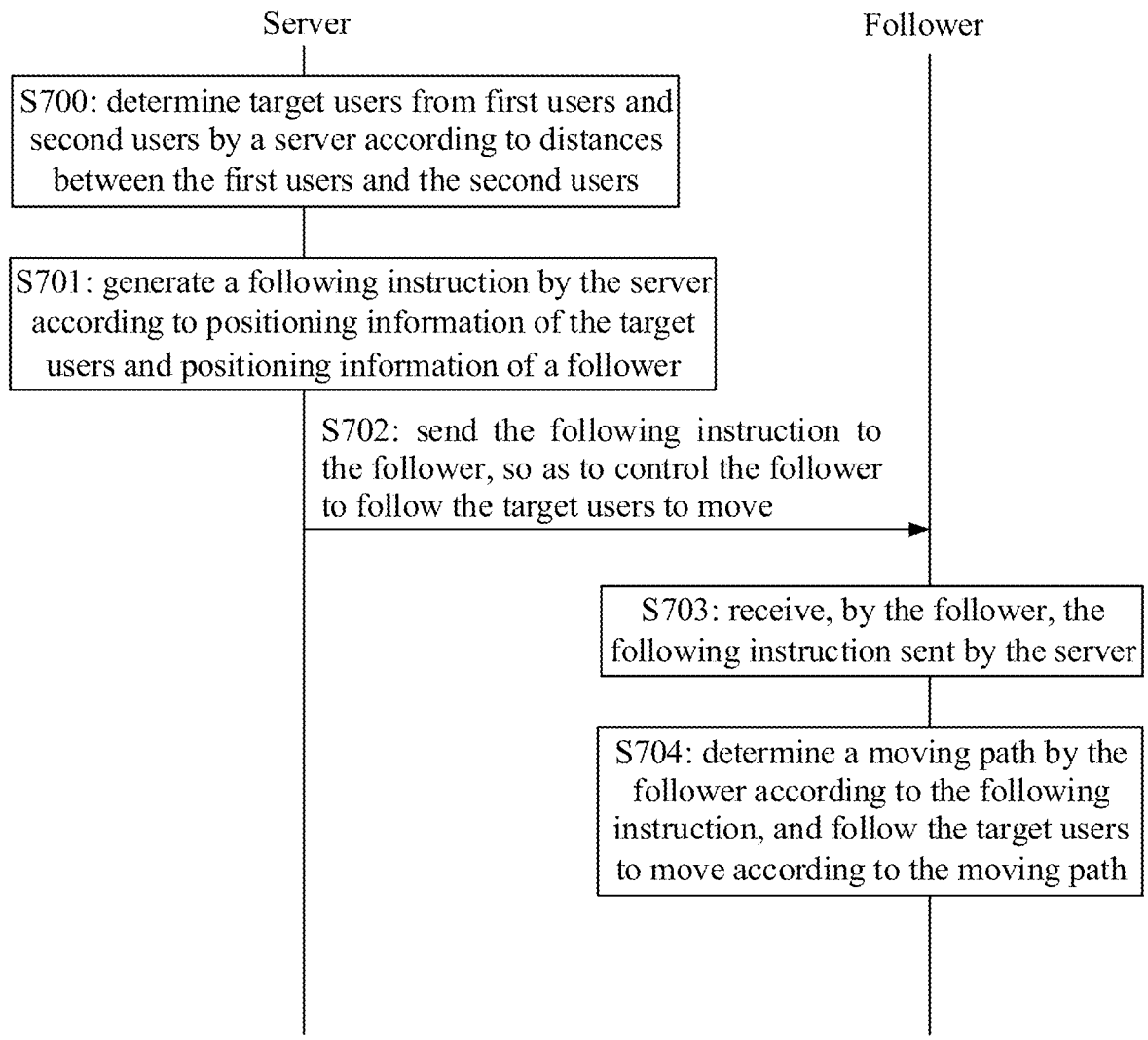
FIG. 7 is a flow diagram of interaction between modules of an intelligent following apparatus according to an embodiment of the present disclosure.

As shown in FIG. 7, the embodiments provide a flow diagram of interaction between modules of an intelligent following apparatus, which is shown as follows S700 to S704.

S700: determine target users from the first users and the second users by a server according to distances between the first users and the second users.

The first users represent users visiting an exhibit, and the second users represent users introducing an exhibit.

Step 701: generate a following instruction by the server according to the positioning information of the target users and the positioning information of the follower.

Step 702: send the following instruction to the follower, so as to control the follower to follow the target users to move.

Step 703: receive, by the follower, the following instruction sent by the server.

Step 704: determine a moving path by the follower according to the following instruction, and follow the target users to move according to the moving path.

Optionally, a control instruction may be determined according to the target users, and the control instruction may be sent to the follower to control the follower to display exhibit information related to the exhibit; and/or a control instruction is sent to at least one exhibition assembly to control the exhibition assembly to execute a corresponding operation.

Figure 8:
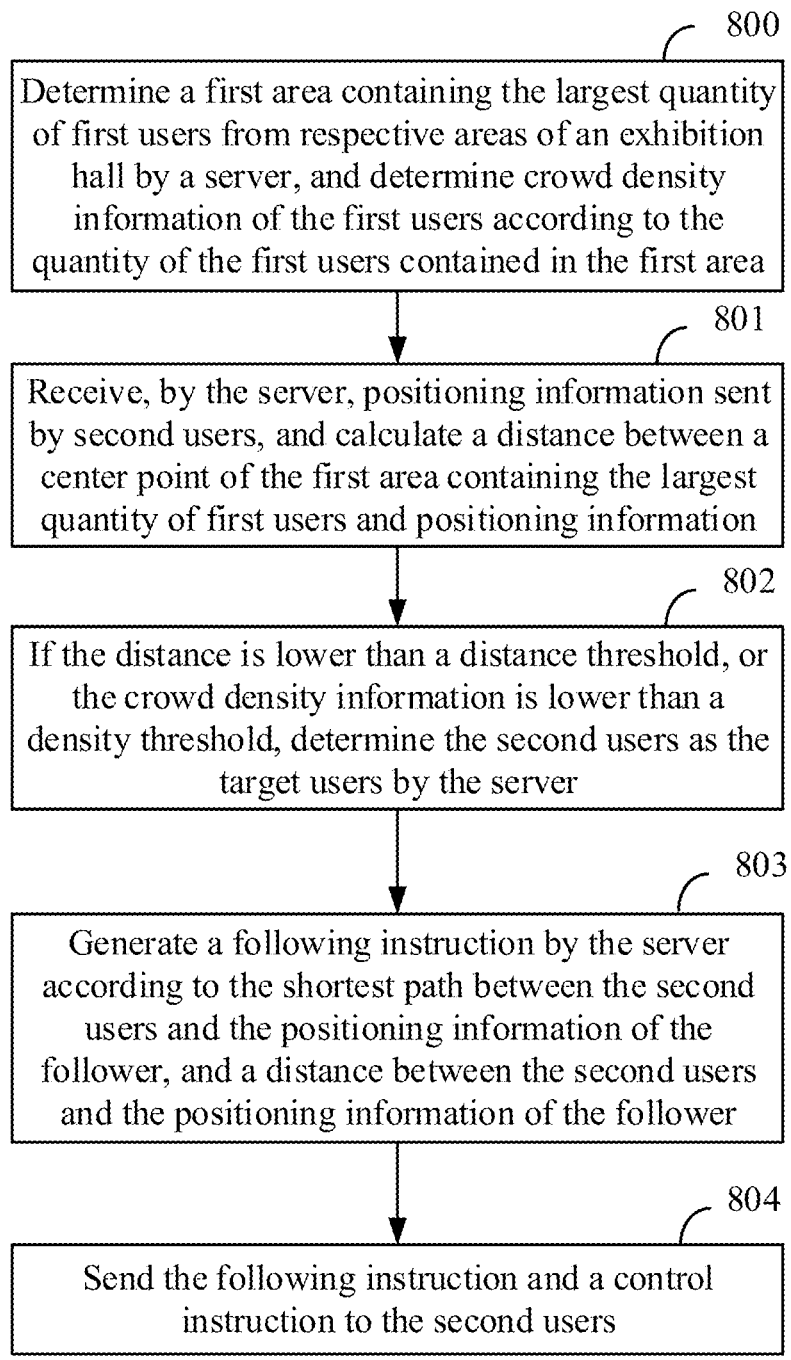
FIG. 8 is a flow diagram of implementing a method for intelligently interpreting an exhibition scene in an assisted manner according to an embodiment of the present disclosure.

As shown in FIG. 8, the case that following targets are second users is taken as an embodiment, the embodiment of the present disclosure provides a method for intelligently interpreting an exhibition scene in an assisted manner, and an implementation flow of the method is specifically shown as follows.

S800: determine a first area containing the largest quantity of first users from each area of the exhibition hall by the server, and determine crowd density information of the first users according to the quantity of the first users contained in the first area.

A size of the first area is fixed.

Step 801: receive, by the server, positioning information sent by the second users, and compute a distance between a center point of the first area containing the largest quantity of first users and positioning information.

Step 802: if the distance is lower than a distance threshold or the crowd density information is lower than a density threshold, determine the second users as the target users by the server.

Step 803: generate a following instruction by the server according to the shortest path between the second users and the positioning information of the follower, and a distance between the second users and the positioning information of the follower.

Step 804: send a following instruction and a control instruction to the second users.

The control instruction includes a control instruction for exhibit information of the exhibition assembly and/or the exhibit.

Figure 9:
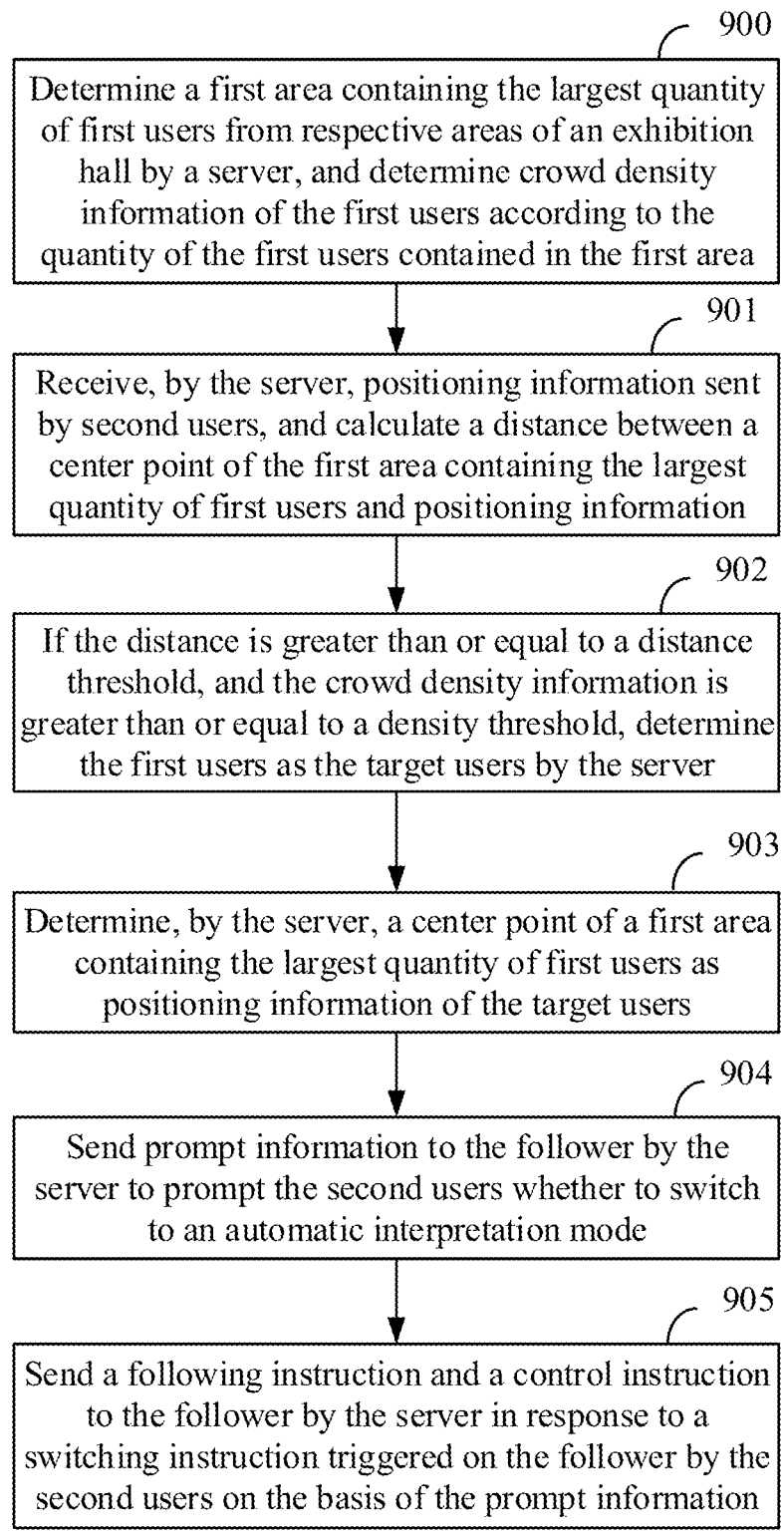
FIG. 9 is a flow diagram of implementing a method for intelligently interpreting an exhibition scene in an independent manner according to an embodiment of the present disclosure.

As shown in FIG. 9, the case that following targets are first users is taken as an embodiment, the embodiment of the present disclosure provides a method for intelligently interpreting an exhibition scene in an independent manner, and an implementation flow of the method is specifically shown as follows S900 to S905.

S900: determine a first area containing the largest quantity of first users from each area of the exhibition hall by the server, and determine crowd density information of the first users according to the quantity of the first users contained in the first area.

A size of the first area is fixed.

S901: receive, by the server, positioning information sent by the second users, and compute a distance between a center point of the first area containing the largest quantity of first users and positioning information.

S902: if the distance is greater than or equal to a distance threshold, and the crowd density information is greater than or equal to a density threshold, determine the first users as the target users by the server.

S903: determine, by the server, a center point of a first area containing the largest quantity of first users as positioning information of the target users.

S904: send prompt information to the follower by the server to prompt the second users whether to switch to an automatic interpretation mode.

The automatic interpretation mode represents that the follower automatically displays exhibit information.

S905: send a following instruction and a control instruction to the follower by the server in response to a switching instruction triggered on the follower by the second user on the basis of the prompt information.

In the embodiment, the follower may be instructed to follow the first users to move, and automatically display the exhibit information, and/or automatically control the exhibition assembly.

The following instruction is generated according to the shortest path between the target users and the positioning information of the follower and the distance between the target users and the positioning information of the follower.

It is ensured that the follower keeps a certain distance from the target users all the time in a process of following the target users, and the control instruction includes a control instruction for exhibit information of the exhibition assembly and/or the exhibit.

Figure 10:
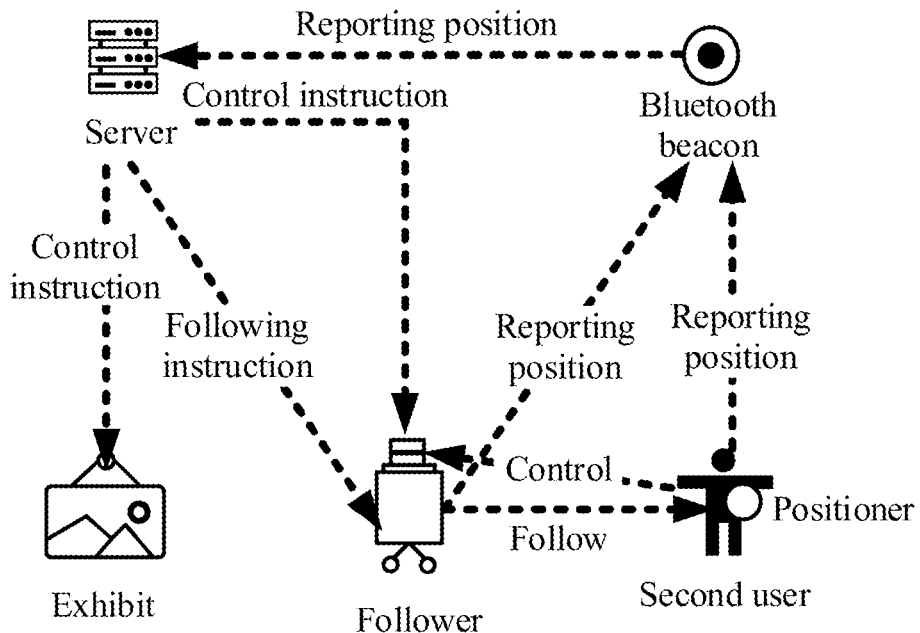
FIG. 10 is a schematic diagram of an assisted interpretation mode according to an embodiment of the present disclosure.

As shown in FIG. 10, the embodiments further provide a schematic diagram of an assisted interpretation mode. The intelligent following apparatus includes a server and a follower. In this mode, the followed target users are second users, that is, interpretation users, and the interpretation users wear positioners and report positioning information to a Bluetooth beacon. Moreover, the follower reports positioning information to the Bluetooth beacon, and the Bluetooth beacon sends the positioning information of the interpretation users to the server, and the server generates a following instruction according to the reported positioning information and sends the following instruction to an intelligent follower, so as to instruct the follower to follow the interpretation users to move. The interpretation users may further carry out touch operation on contents related to the exhibit displayed by the follower, the second user triggers an operation instruction on the follower, the follower sends the operation instruction to the server, and the server triggers generation of a control instruction according to the received operation instruction and sends the control instruction to the follower and the exhibition component, so as to instruct the follower and the exhibition assembly to execute corresponding operations.

The follower in the embodiments includes a touch display screen, which is detachable.

Figure 11:
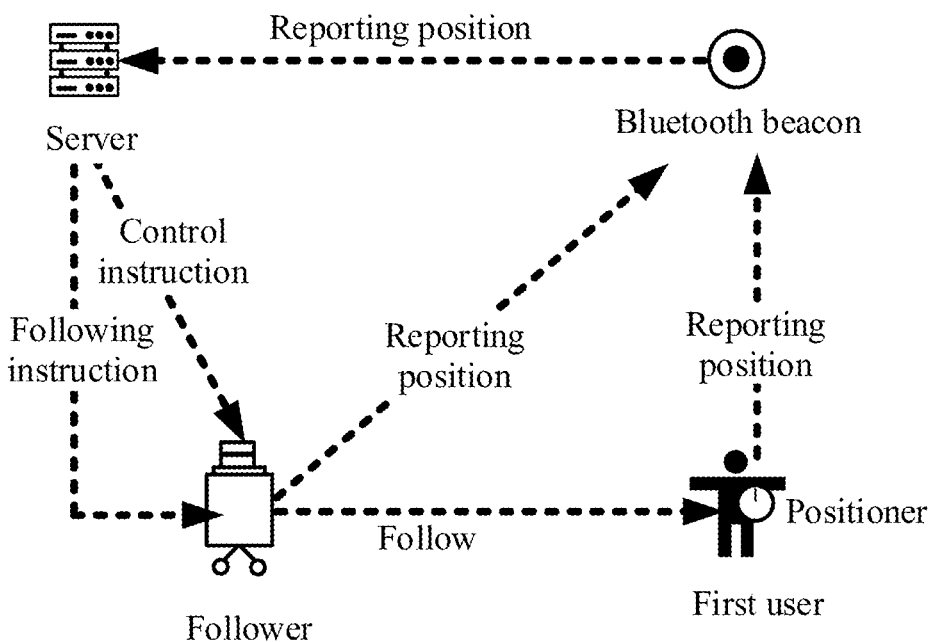
FIG. 11 is a schematic diagram of an independent interpretation mode according to an embodiment of the present disclosure.

As shown in FIG. 11, the embodiments further provide a schematic diagram of an independent interpretation mode. The intelligent following apparatus includes a server and a follower, and in this mode, the followed target users are first users, that is, visiting users. During implementation, a target visiting user may be selected from the visiting users, and positioning information of the target visiting user may be reported to a Bluetooth beacon according to a positioner worn by the target visiting user. Moreover, the follower may report positioning information to the Bluetooth beacon, the Bluetooth beacon sends the positioning information (as the positioning information of the first user) of the target visiting user to the server, and the server generates a following instruction according to the reported positioning information and sends the following instruction to the follower, so as to instruct the follower to follow the first user to move. Furthermore, after it is detected that the follower enters an electronic fence area of a certain exhibit, a control instruction is sent to the follower to control the follower to automatically display the exhibit information related to the exhibit.

On the basis of the same inventive concept, an embodiment of the present disclosure further provides a method for intelligently interpreting an exhibition scene, which may be applied to an intelligent following apparatus. An implementation principle of the method is the same as that of the above-mentioned system, and a specific embodiment can be obtained with reference to the above-mentioned contents, and will not be repeated herein.

Figure 12:
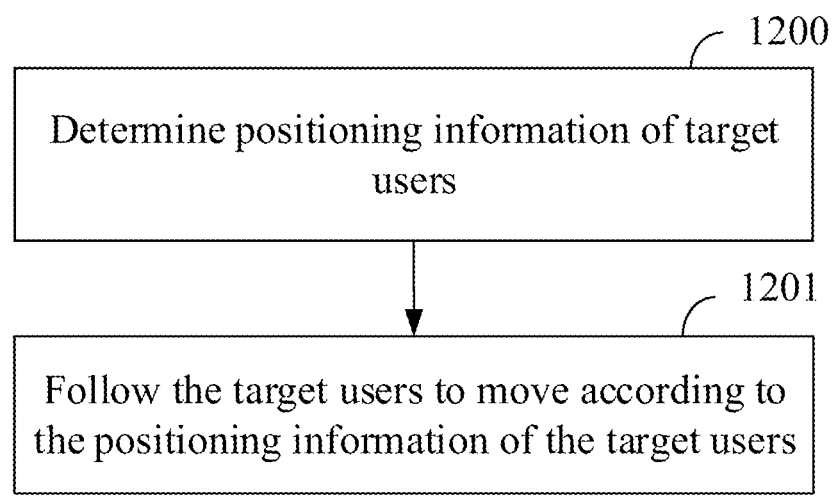
FIG. 12 is a flow diagram of implementing a method for intelligently interpreting an exhibition scene according to an embodiment of the present disclosure.

As shown in FIG. 12, the embodiment further provides a method for intelligently interpreting an exhibition scene. A specific implementation flow of the method is as follows.

S1200: determine positioning information of target users.
S1201: follow the target users to move according to the positioning information of the target users.

As an optional embodiment, the method further includes: generating a control instruction, and correspondingly control at least one exhibition assembly according to the generated control instruction.

As an optional embodiment, the method further includes: intelligently interpreting exhibit information of at least one exhibit.

As an optional embodiment, the method further includes: executing switching between a plurality of following modes, where types of target users followed by the intelligent following apparatus in different following modes are different, and the types of the target users are determined according to at least one of a visiting purpose, an interaction relation with the exhibit, and an interaction relation with an exhibition assembly.

As an optional embodiment, the method further includes: stopping following when the target users stop moving, and determining position information of an intelligent following apparatus when following is stopped.

As an optional embodiment, the control instruction is generated through the following method: generating the control instruction according to the positioning information of the target users; or generating the control instruction according to positioning information of the intelligent following apparatus.

As an optional embodiment, the intelligently interpreting exhibit information of at least one exhibition includes: determining the at least one exhibit according to the positioning information of the target users, and intelligently interpret the exhibit information of the at least one exhibit; or determining the at least one exhibit according to positioning information of the intelligent following apparatus, and intelligently interpret the exhibit information of the at least one exhibit.

As an optional embodiment, in the case that the target users followed by the intelligent following apparatus include a first user visiting the exhibit, the following mode includes at least one method for intelligently interpreting exhibit information by the intelligent following apparatus.

As an optional embodiment, the determining position information when following is stopped includes: determining the shortest line segment according to positioning information when the target users stop moving and an exhibit closest to the positioning information; determining a preset area by taking the positioning information when moving is stopped as a center; and determining, according to an intersection of the shortest line segment and the preset area and an orientation of the intelligent following apparatus relative to the target users, the position information of the intelligent following apparatus when following is stopped.

As an optional embodiment, the determining the shortest line segment according to positioning information when the target users stop moving and an exhibit closest to the positioning information includes: determining the shortest line segment according to the positioning information when the target users stop moving and an edge position of the exhibit closest to the positioning information.

As an optional embodiment, the target users include a first user visiting the exhibit.

As an optional embodiment, generation of the control instruction is triggered in response to a first operation of the target users.

As an optional embodiment, the executing switching between a plurality of following modes includes: triggering generation of a switching instruction in response to a second operation of the target users, and executing switching between the plurality of following modes according to the switching instruction.

As an optional embodiment, the determining the shortest line segment according to positioning information when the target users stop moving and an exhibit closest to the positioning information includes: determining the shortest line segment according to the positioning information when the target users stop moving and a center position of the exhibit closest to the positioning information.

As an optional embodiment, the target users include a second user introducing the exhibit.

As an optional embodiment, when the target users followed by the intelligent following apparatus include a second user introducing the exhibit, the following mode includes at least one mode of controlling the exhibition assembly by the intelligent following apparatus.

As an optional embodiment, the executing switching between a plurality of following modes includes: triggering execution of switching between the plurality of following modes according to positioning information of different types of target users.

As an optional embodiment, the target users include a first user visiting the exhibit and a second user introducing the exhibit, and the triggering execution of switching between the plurality of following modes by the intelligent following apparatus according to positioning information of different types of target users includes: triggering execution of switching between the plurality of following modes according to positioning information of the first user and the second user.

As an optional embodiment, the triggering execution of switching between the plurality of following modes by the intelligent following apparatus according to positioning information of the first user and the second user includes: triggering execution of switching between the plurality of following modes according to the positioning information of the first user and the second user and crowd density information of the first user.

As an optional embodiment, generation of the control instruction is triggered by a touch signal received by a touch display screen.

As an optional embodiment, generation of the switching instruction is triggered by a touch signal received by a touch display screen.

As an optional embodiment, the method further includes: displaying an image of the exhibit information of the at least one exhibit by means of the touch display screen.

As an optional embodiment, the positioning information of the target users is determined through the following method: determining the positioning information of the target users by means of positioners carried by the target users.

As an optional embodiment, the target users include a second user introducing the exhibit.

As an optional embodiment, there are a plurality of target users, and the determining the positioning information of the target users by the positioning apparatus by means of the positioners carried by the target users includes: determining an area containing the plurality of target users according to the positioners carried by the plurality of target users; and determining the positioning information of the target users according to a center point of the area or the positioner of the target user closest to the center point of the area.

As an optional embodiment, the positioning information of the target users is determined through the following method: determining the positioning information of the target users according to an image of the target users acquired by a camera assembly.

As an optional embodiment, there are a plurality of target users, and the determining the positioning information of the target users according to an image of the target users acquired by the camera assembly includes: identifying an image containing a plurality of target users acquired by the camera assembly to determine an area containing the plurality of target users; and determining the positioning information of the target users according to a center point of the area or a position of the target user closest to the center point of the area, the position of the target user closest to the center point of the area being obtained by identifying the image containing the plurality of target users.

As an optional embodiment, the target users include a first user visiting the exhibit.

As an optional embodiment, in the case that the target users include a first user visiting the exhibit, crowd density information of the first user is determined through the following method: determining the crowd density information of the first user according to a size of the area and the quantity of positioners detected in the area.

As an optional embodiment, in the case that the target users include a first user visiting the exhibit, crowd density information of the first user is determined through the following method: determining the crowd density information of the first user according to a size of the area and the quantity of the first user identified in the area.

As an optional embodiment, the positioning information of an intelligent following apparatus is determined through the following method: determining the positioning information of the intelligent following apparatus according to a positioner carried by the intelligent following apparatus.

As an optional embodiment, the positioning information of an intelligent following apparatus is determined through the following method: identifying an image containing the intelligent following apparatus acquired by the camera assembly to determine the positioning information of the intelligent following apparatus.

As an optional embodiment, the exhibit information includes at least one of a video, a picture, an audio, light and a projection.

As an optional embodiment, the control instruction includes at least one of play switching, pause, volume adjustment, play progress adjustment and on-off control.

As an optional embodiment, the exhibition assembly includes at least one of a display assembly, a light assembly, an intelligent air conditioner device and an intelligent internet of things device.

On the basis of the same inventive concept, an embodiment of the present disclosure further provides an apparatus for intelligently interpreting an exhibition scene. Since the apparatus is the apparatus in the method in the embodiment of the present disclosure, and the principle of solving problems by the apparatus is similar to that of the method, implementation of the apparatus can be obtained with reference to implementation of the method, and repetitions will not be described herein.

Figure 13:
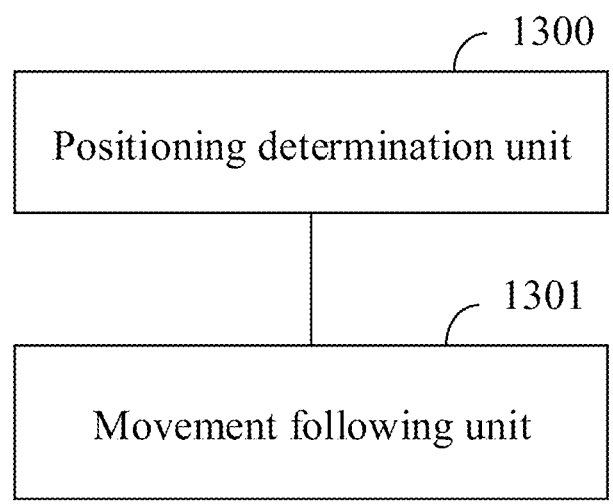
FIG. 13 is a schematic diagram of an apparatus for intelligently interpreting an exhibition scene according to an embodiment of the present disclosure.

As shown in FIG. 13, the apparatus includes: a positioning determination unit 1300 configured for determining positioning information of target users; and a movement following unit 1301 for following the target users to move according to the positioning information of the target users.

On the basis of the same inventive concept, an embodiment of the present disclosure further provides a computer storage medium. The computer storage medium stores a computer program, and the program implements the following steps when executed by a processor: determining positioning information of target users; and following the target users to move according to the positioning information of the target users.

Those skilled in the art should understand that embodiments of the present disclosure can be provided as methods, systems, or computer program products. Therefore, the present disclosure can employ full hardware embodiments, full software embodiments, or software and hardware combined embodiments. Moreover, the present disclosure can employ a computer program product implemented on one or more computer storage media (including, but not limited to, disc memories and optical memories, etc.) containing computer program codes.

The present disclosure is described with reference to flow diagrams and/or block diagrams of methods, devices (systems), and computer program products in embodiments of the present disclosure. It should be understood that each flow and/or block in the flow diagrams and/or block diagrams and combinations of the flows and or blocks in the flow diagrams and/or block diagrams can be implemented by computer program instructions. These computer program instructions can be provided for a processor of a general-purpose computer, a special-purpose computer, an embedded processor, or other programmable data processing devices to produce a machine, such that instructions executed by the processor of the computer or other programmable data processing devices produce an apparatus for implementing specified functions in one or more flows in each flow diagram and/or one or more blocks in each block diagram.

These computer program instructions may be also stored in a computer readable memory that can guide a computer or other programmable data processing devices to work in a specific manner, such that instructions stored in the computer readable memory produce an article of manufacture including an instruction apparatus, and the instruction apparatus implements specified functions in one or more flows in each flow diagram and/or one or more blocks in each block diagram.

These computer program instructions may be loaded onto a computer or other programmable data processing devices, such that a series of operations and steps are executed on the computer or other programmable devices to generate computer-implemented processing. Therefore, the instructions executed on the computer or other programmable devices provide steps for implementing specific functions in one or more flows in each flow diagram and/or one or more blocks in each block diagram.

Apparently, those skilled in the art can make various modifications and variations to the present disclosure without departing from the spirit and scope of the present disclosure. In this way, in the case that these modifications and variations of the present disclosure fall within the scope of the claims of the present disclosure and equivalent technologies thereof, the present disclosure is further intended to include these modifications and variations.

What is claimed is:

1. A system for intelligently interpreting an exhibition scene, comprising a positioning apparatus, an intelligent following apparatus, a memory and at least one processor, wherein the at least one processor is configured to read instructions stored in the memory to:
    control the positioning apparatus to determine positioning information of target users; and
    control the intelligent following apparatus to move by following the target users according to the positioning information of the target users;
    wherein the at least one processor is further configured to read the instructions stored in the memory to control the intelligent following apparatus to generate a control instruction, and correspondingly control at least one exhibition assembly according to the generated control instruction.

2. The system according to claim 1, wherein the intelligent following apparatus further comprises a sounding device, and the at least one processor is further configured to read the instructions stored in the memory to:
    control the intelligent following apparatus to intelligently interpret exhibit information of at least one exhibit by means of the sounding device.

3. The system according to claim 2, wherein the at least one processor is further configured to read the instructions stored in the memory to:
    control the intelligent following apparatus to determine the at least one exhibit according to the positioning information of the target users, and to intelligently interpret the exhibit information of the at least one exhibit by means of the sounding device; or
    control the intelligent following apparatus to determine the at least one exhibit according to positioning information of the intelligent following apparatus, and to intelligently interpret the exhibit information of the at least one exhibit by means of the sounding device.

4. The system according to claim 1, wherein the at least one processor is further configured to read the instructions stored in the memory to:
    control the intelligent following apparatus to execute switching between a plurality of following modes, wherein types of target users followed by the intelligent following apparatus in different following modes are different, and the types of the target users are determined according to at least one of a visiting purpose, an interaction relation with an exhibit, and an interaction relation with an exhibition assembly; and/or
    control the intelligent following apparatus to stop following when the target users stop moving, and to determine position information of the intelligent following apparatus when following is stopped.

5. The system according to claim 4, wherein
    in a case that the target users followed by the intelligent following apparatus comprise a first user visiting the exhibit, the following mode comprises at least one method for intelligently interpreting exhibit information by the intelligent following apparatus.

6. The system according to claim 4, wherein the at least one processor is further configured to read the instructions stored in the memory to:
    control the intelligent following apparatus to determine a shortest line segment according to positioning information when the target users stop moving and an exhibit closest to the positioning information;
    control the intelligent following apparatus to determine a preset area by taking the positioning information when moving is stopped as a center; and
    control the intelligent following apparatus to determine, according to an intersection of the shortest line segment and the preset area and an orientation of the intelligent following apparatus relative to the target users, the position information of the intelligent following apparatus when following is stopped.

7. The system according to claim 6, wherein the at least one processor is further configured to read the instructions stored in the memory to:

control the intelligent following apparatus to determine the shortest line segment according to the positioning information when the target users stop moving and an edge position of the exhibit closest to the positioning information; or control the intelligent following apparatus to determine the shortest line segment according to the positioning information when the target users stop moving and a center position of the exhibit closest to the positioning information.

8. The system according to claim 4, wherein the at least one processor is further configured to read the instructions stored in the memory to:

control the intelligent following apparatus to trigger generation of a switching instruction in response to a second operation of the target users, and to execute switching between the plurality of following modes according to the switching instruction.

9. The system according to claim 4, wherein when the target users followed by the intelligent following apparatus comprise a second user introducing the exhibit, the following modes comprise at least one mode of controlling the exhibition assembly by the intelligent following apparatus.

10. The system according to claim 4, wherein the at least one processor is further configured to read the instructions stored in the memory to:

control the intelligent following apparatus to trigger execution of switching between the plurality of following modes according to positioning information of different types of target users;

wherein the target users comprise a first user visiting the exhibit and a second user introducing the exhibit, and the at least one processor is further configured to read the instructions stored in the memory to:

control the intelligent following apparatus to trigger execution of switching between the plurality of following modes according to positioning information of the first user and the second user;

wherein the at least one processor is further configured to read the instructions stored in the memory to:

control the intelligent following apparatus to trigger execution of switching between the plurality of following modes according to the positioning information of the first user and the second user and crowd density information of the first user.

11. The system according to claim 1, wherein the control instruction is generated by:

generating the control instruction by the intelligent following apparatus according to the positioning information of the target users; or generating the control instruction by the intelligent following apparatus according to positioning information of the intelligent following apparatus.

12. The system according to claim 11, wherein the positioning apparatus comprises positioners, and the at least one processor is further configured to read the instructions stored in the memory to:

control the positioning apparatus to determine the positioning information of the intelligent following apparatus according to the positioner carried by the intelligent following apparatus; and/or wherein the positioning apparatus comprises a camera assembly, and the at least one processor is further configured to read the instructions stored in the memory to:

control the positioning apparatus to identify an image containing the intelligent following apparatus acquired by the camera assembly to determine the positioning information of the intelligent following apparatus.

13. The system according to claim 1, wherein the at least one processor is further configured to read the instructions stored in the memory to:

control the intelligent following apparatus to trigger generation of the control instruction in response to a first operation of the target users.

14. The system according to claim 1, wherein the positioning apparatus comprises positioners, and the at least one processor is further configured to read the instructions stored in the memory to:

control the positioning apparatus to determine the positioning information of the target users by means of the positioners carried by the target users;

wherein a plurality of target users are included, and the at least one processor is further configured to read the instructions stored in the memory to:

control the positioning apparatus to determine an area containing the plurality of target users according to the positioners carried by the plurality of target users; and control the positioning apparatus to determine the positioning information of the target users according to a center point of the area or the positioner of the target user closest to the center point of the area.

15. The system according to claim 14, wherein in a case that the target users comprise a first user visiting the exhibit, the at least one processor is further configured to read the instructions stored in the memory to:

control the positioning apparatus to determine the crowd density information of the first user according to a size of the area and a quantity of positioners detected in the area.

16. The system according to claim 1, wherein the positioning apparatus comprises a camera assembly, and the at least one processor is further configured to read the instructions stored in the memory to:

control the positioning apparatus to determine the positioning information of the target users according to an image of the target users acquired by the camera assembly;

wherein a plurality of target users are included, and the at least one processor is further configured to read the instructions stored in the memory to:

control the positioning apparatus to identify an image containing the plurality of target users acquired by the camera assembly to determine an area containing the plurality of target users; and control the positioning apparatus to determine the positioning information of the target users according to a center point of the area or a position of the target user closest to the center point of the area, where the position of the target user closest to the center point of the area is obtained by identifying the image containing the plurality of target users.

17. The system according to claim 16, wherein in a case that the target users comprise a first user visiting the exhibit, the at least one processor is further configured to read the instructions stored in the memory to:

control the positioning apparatus to determine the crowd density information of the first user according to a size of the area and a quantity of the first user identified in the area.

* * * * *